(12) United States Patent
Kawakami et al.

(10) Patent No.: US 11,571,943 B2
(45) Date of Patent: Feb. 7, 2023

(54) HOLLOW STABILIZER, STABILIZER MANUFACTURING DEVICE, AND METHOD FOR MANUFACTURING HOLLOW STABILIZER

(71) Applicant: NHK SPRING CO., LTD., Yokohama (JP)

(72) Inventors: Norihiro Kawakami, Yokohama (JP); Yurika Okudaira, Yokohama (JP); Yuushi Nogami, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/355,520

(22) Filed: Jun. 23, 2021

(65) Prior Publication Data

US 2021/0316589 A1  Oct. 14, 2021

Related U.S. Application Data

(60) Division of application No. 16/586,692, filed on Sep. 27, 2019, now Pat. No. 11,167,615, which is a
(Continued)

(30) Foreign Application Priority Data

Mar. 30, 2017 (JP) .............................. JP2017-066800
Feb. 22, 2018 (JP) .............................. JP2018-030036

(51) Int. Cl.
*B60G 21/055* (2006.01)
*B21D 7/024* (2006.01)
*F16F 1/14* (2006.01)

(52) U.S. Cl.
CPC ........... *B60G 21/055* (2013.01); *B21D 7/024* (2013.01); *F16F 1/14* (2013.01);
(Continued)

(58) Field of Classification Search
CPC ............ B60G 21/055; B60G 2202/135; B60G 2206/427; B60G 2206/724;
(Continued)

(56) References Cited

U.S. PATENT DOCUMENTS 1,061,067 A * 5/1913 Grady .................... B21D 7/024
                                                       72/158
2,399,892 A * 5/1946 Sato ....................... B21D 53/74
                                                       72/158
(Continued)

FOREIGN PATENT DOCUMENTS

CN        1539660 A    10/2004
CN      101003067 A     7/2007
(Continued)

OTHER PUBLICATIONS

Extended European Search Report (EESR) dated Dec. 14, 2020 issued in European Application No. 18775833.9.
(Continued)

*Primary Examiner* — Drew J Brown
(74) *Attorney, Agent, or Firm* — Holtz, Holtz & Volek PC

(57) ABSTRACT

A hollow stabilizer includes a curved part having eight regions defined in a cross section. A first region includes a 90° first part when the center of the inside of the curve is taken to be at 0° and the center of the outside of the curve is taken to be at 180°. A third region includes a 0° third part. A fifth region includes a 270° fifth part. A seventh region includes a 180° seventh part. The radii of curvature of the respective outer surfaces of the third part and the seventh part are larger and the radii of curvature of the respective outer surfaces of the second part and the sixth part are smaller than the radii of curvature of the respective outer surfaces of the fourth part and the fifth part.

3 Claims, 19 Drawing Sheets

Related U.S. Application Data continuation of application No. PCT/JP2018/009309, filed on Mar. 9, 2018.

(52) U.S. Cl.
CPC .. *B60G 2202/135* (2013.01); *B60G 2206/427* (2013.01); *B60G 2206/724* (2013.01); *F16F 2224/0208* (2013.01); *F16F 2234/02* (2013.01)

(58) Field of Classification Search
CPC ...... B60G 2206/012; B60G 2206/8103; B60G 7/001; B60G 2206/10; B21D 7/024; B21D 53/88; F16F 1/14; F16F 2224/0208; F16F 2234/02; F16F 2226/04
See application file for complete search history.

(56) References Cited

U.S. PATENT DOCUMENTS

| | | | | |
|---|---|---|---|---|
| 3,763,685 | A | * | 10/1973 | Fjellstrom ............... B21D 7/022 72/217 |
| 4,055,065 | A | | 10/1977 | Whetstone et al. |
| 4,282,737 | A | * | 8/1981 | Maples ................. B21D 7/063 72/31.11 |
| 4,372,576 | A | | 2/1983 | Inoue |
| 4,841,760 | A | | 6/1989 | Ferguson |
| 4,909,059 | A | * | 3/1990 | King ...................... B21D 7/022 72/215 |
| 4,961,335 | A | | 10/1990 | Kimura |
| 5,275,031 | A | | 1/1994 | Whiteside et al. |
| 5,339,670 | A | | 8/1994 | Granelli |
| 5,598,735 | A | | 2/1997 | Saito et al. |
| 5,626,045 | A | * | 5/1997 | Bulle ..................... B21D 7/022 72/219 |
| 7,536,890 | B2 | * | 5/2009 | Bulle ...................... B21D 7/02 72/155 |
| 7,591,453 | B2 | | 9/2009 | Sundgren et al. |
| 8,234,898 | B1 | * | 8/2012 | Wilson .................. B21D 9/073 72/154 |
| 8,827,288 | B2 | | 9/2014 | Kuroda et al. |
| 10,144,264 | B2 | | 12/2018 | Mucher et al. |
| 10,415,110 | B2 | | 9/2019 | Wakabayshi et al. |
| 10,792,718 | B2 | * | 10/2020 | Daugherty ............ C12P 21/005 |
| 2002/0069688 | A1 | | 6/2002 | Binno |
| 2005/0214560 | A1 | | 9/2005 | Yue et al. |
| 2006/0076750 | A1 | * | 4/2006 | Sundgren ............ B60G 21/055 280/124.107 |
| 2010/0281938 | A1 | | 11/2010 | Tange et al. |
| 2011/0101630 | A1 | | 5/2011 | Sakai et al. |
| 2020/0139783 | A1 | | 5/2020 | Sakurai et al. |
| 2021/0001425 | A1 | | 1/2021 | Aratani et al. |

FOREIGN PATENT DOCUMENTS

| | | |
|---|---|---|
| CN | 102762396 A | 10/2012 |
| CN | 107249909 A | 10/2017 |
| CN | 106494175 B | 5/2021 |
| EP | 1539516 A1 | 6/2005 |
| JP | S58188518 A | 11/1983 |
| JP | S62224422 A | 10/1987 |
| JP | H2112828 A | 4/1990 |
| JP | H07266837 A | 10/1995 |
| JP | H08142632 A | 6/1996 |
| JP | 2004009125 A | 1/2004 |
| JP | 2010162557 A | 7/2010 |
| JP | 2013203309 A | 10/2013 |
| JP | 5851305 B2 | 12/2015 |
| KR | 920001597 B1 | 2/1992 |
| WO | 2016152671 A1 | 9/2016 |

OTHER PUBLICATIONS

Indian Office Action (and English language translation thereof) dated Sep. 8, 2020 issued in Indian Application No. 201917039759.
International Search Report (ISR) dated Jun. 5, 2018 (and English translation thereof) issued in International Application No. PCT/JP2018/009309.
Japanese Office Action (and English language translation thereof) dated Mar. 17, 2020 issued in Japanese Application No. 2018-030036.
Brazilian Office Action (and English language translation (summary) thereof) dated Jul. 26, 2022, issued in counterpart Brazilian Application No. 112019020540-3.

* cited by examiner

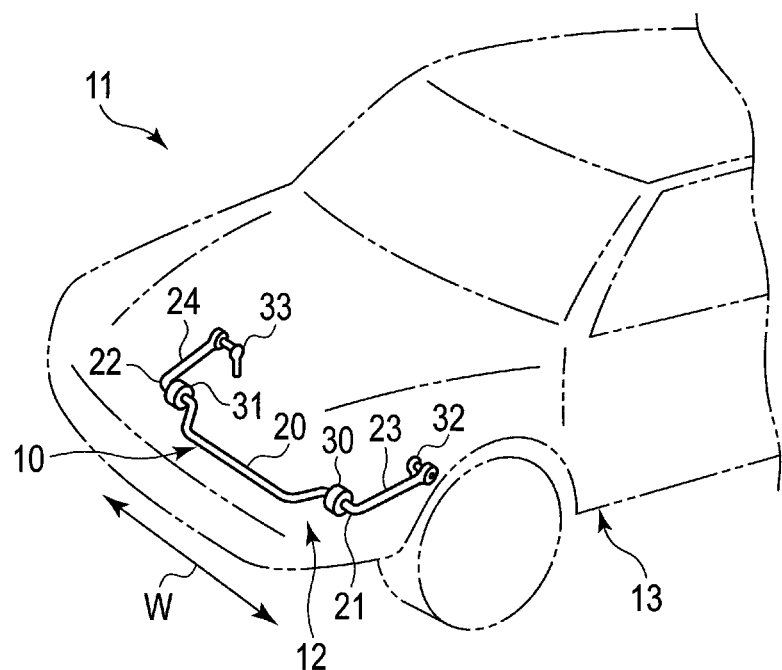
F I G. 1
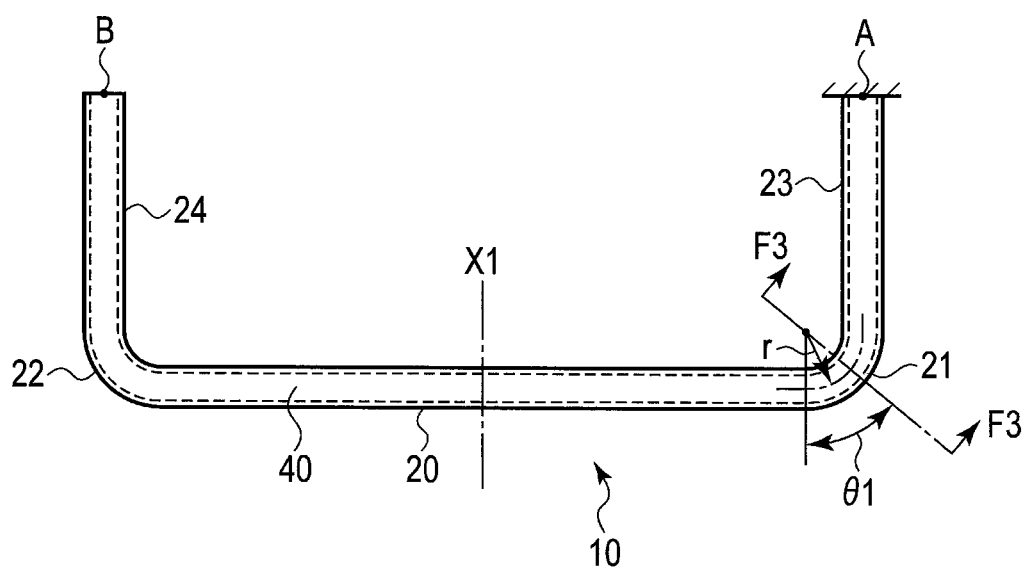
F I G. 2

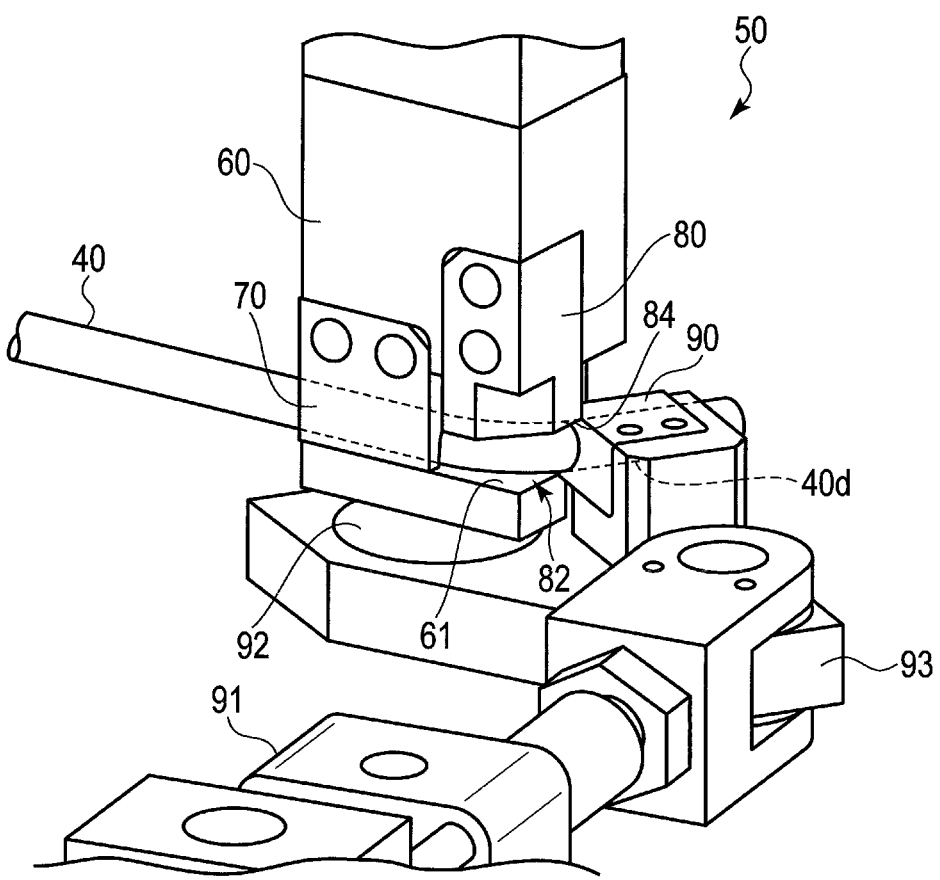
F I G. 6

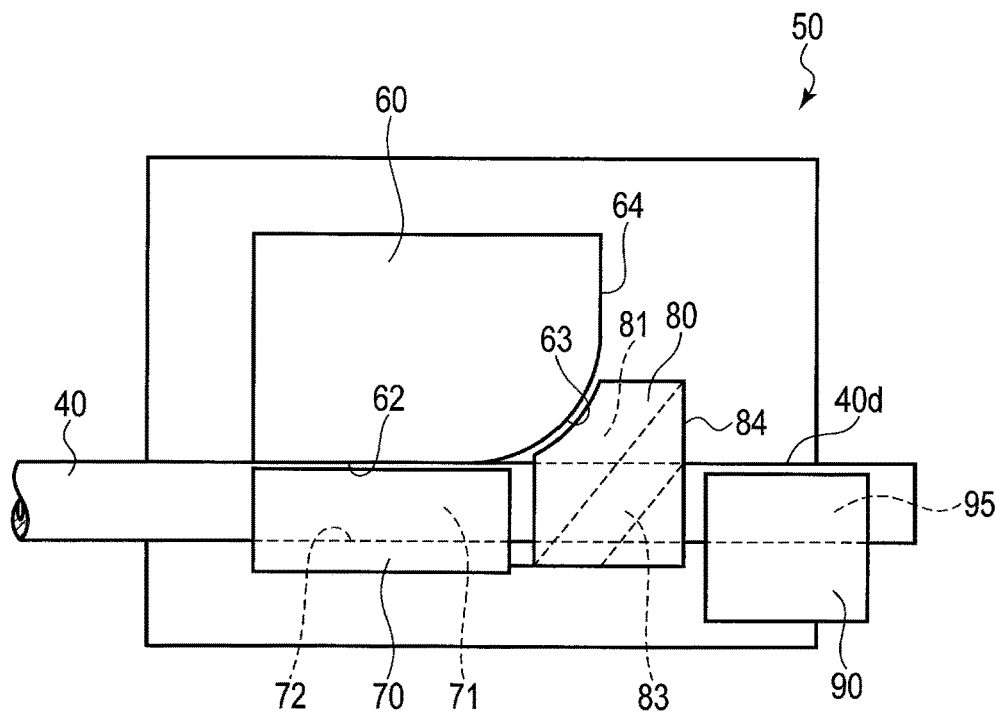
F I G. 8
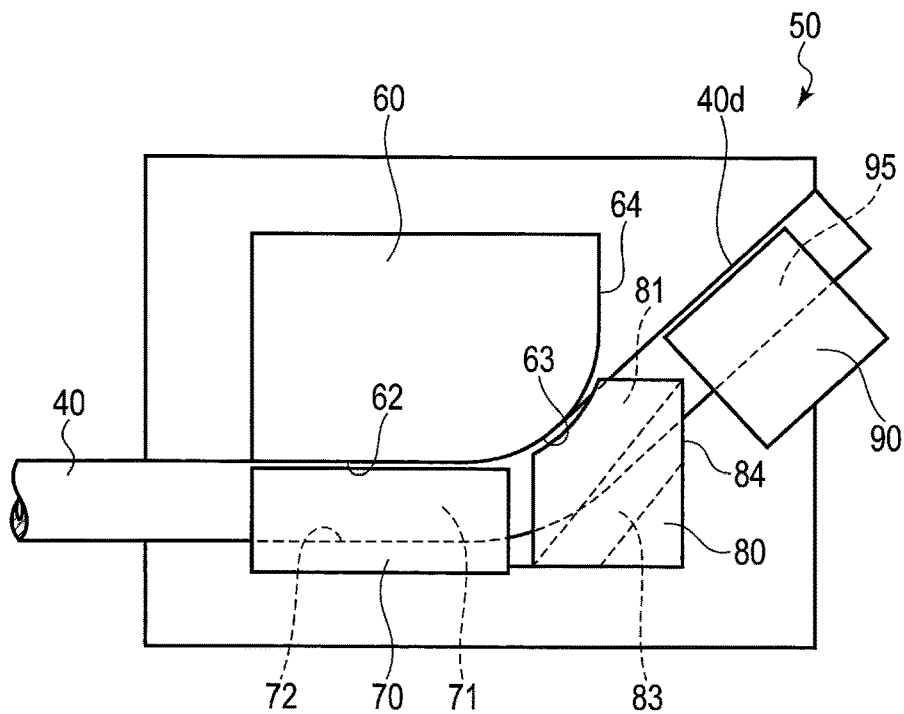
F I G. 9

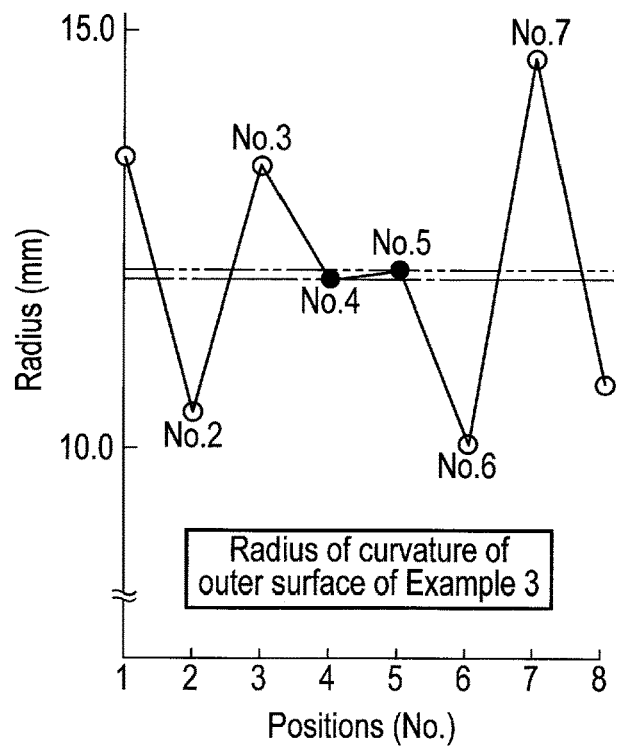
F I G. 18
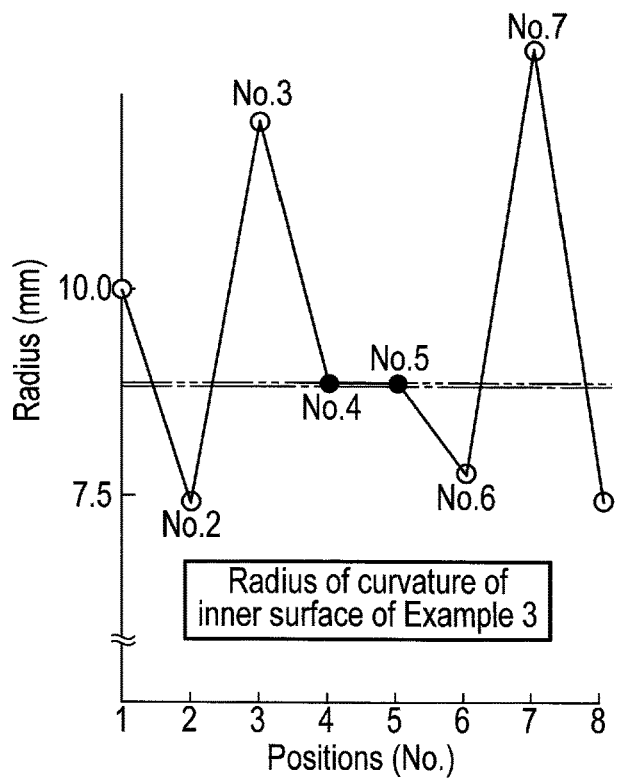
F I G. 19

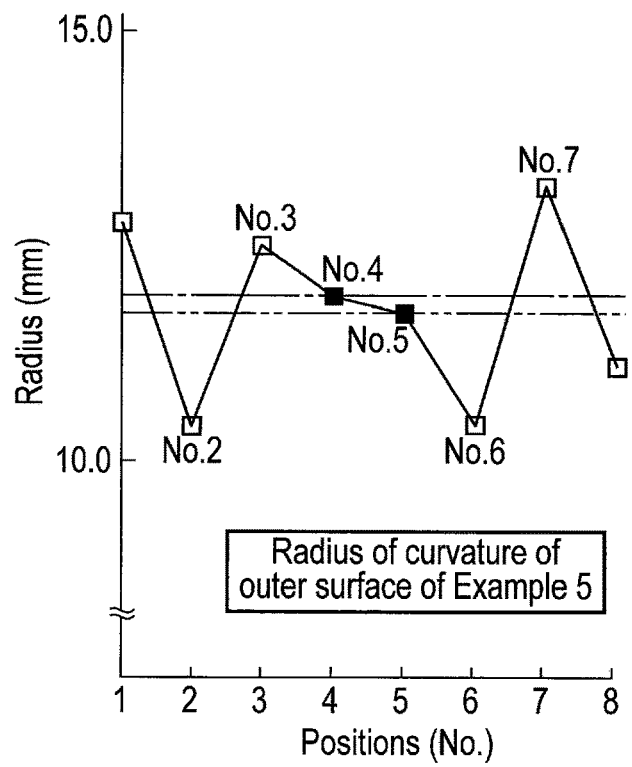
F I G. 22
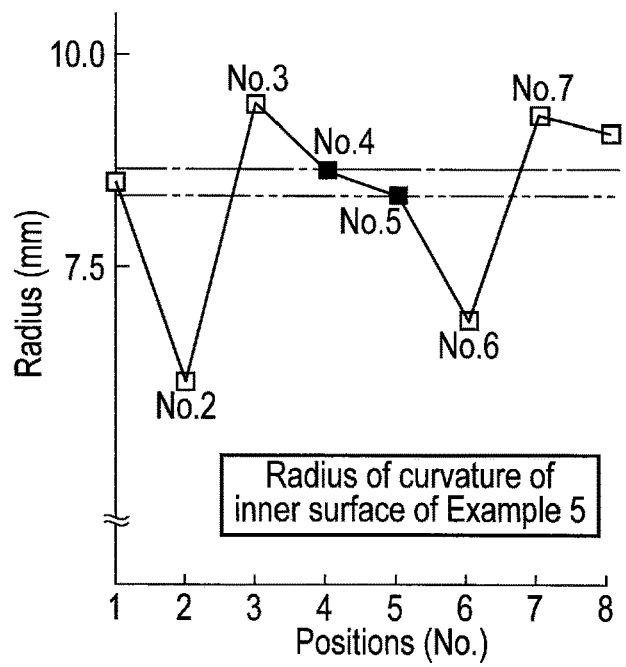
F I G. 23

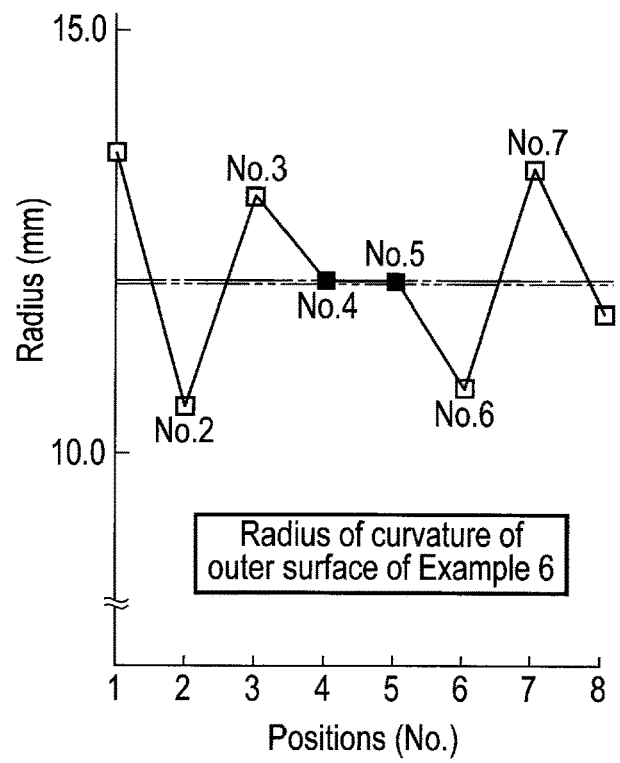
F I G. 24
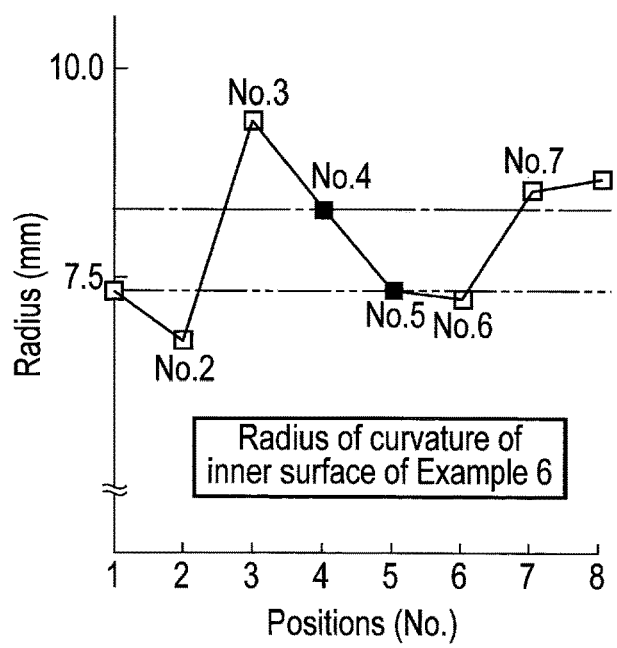
F I G. 25

HOLLOW STABILIZER, STABILIZER MANUFACTURING DEVICE, AND METHOD FOR MANUFACTURING HOLLOW STABILIZER

CROSS-REFERENCE TO RELATED APPLICATIONS

This application is a Divisional Application of U.S. application Ser. No. 16/586,692, filed on Sep. 27, 2019, which is a Continuation Application of PCT Application No. PCT/JP2018/009309, filed Mar. 9, 2018, which is based upon and claims the benefit of priority from prior Japanese Patent Applications No. 2017-066800, filed Mar. 30, 2017, and No. 2018-030036, filed Feb. 22, 2018, the entire contents of all of which are incorporated herein by reference.

BACKGROUND OF THE INVENTION

1. Field of the Invention

The present invention relates generally to a hollow stabilizer disposed in a suspension mechanism part of a vehicle such as a car, a stabilizer manufacturing device, and a method of manufacturing the hollow stabilizer.

2. Description of the Related Art

A stabilizer disposed in a vehicle suspension mechanism part includes a torsion part (twisted part) extending in the width direction of the vehicle, a pair of arm parts continuous with both ends of the torsion part, and a bent part formed between the torsion part and the arm parts. In an example of the suspension mechanism part, the torsion part is supported by a vehicle body via a rubber bushing, etc. The arm parts are connected to a suspension arm or the like of the suspension mechanism part. In the stabilizer assembled to the suspension mechanism part, the arm parts, the bent part, and the torsion part are elastically deformed against the rolling behavior of the vehicle body that occurs when the vehicle travels on a curve, and function as springs. The roll rigidity of the vehicle body can be increased by such a stabilizer.

To reduce the weight of the vehicle, a hollow stabilizer formed of a metal pipe such as a steel pipe has been put into practical use. The pipe that is the material of the hollow stabilizer is a round pipe having a substantially circular cross-section in the radial direction. When such a pipe is formed by a bending machine (pipe bender), the cross section of the bent part (cross section in the pipe radial direction) becomes slightly flat.

As disclosed in, for example, Patent Literature 1 (JP S62-224422 A), a hollow stabilizer having an inner surface of a bent part having an elliptical cross section has been proposed. In addition, as disclosed in Patent Literature 2 (JP 5851305 B), a hollow stabilizer having the pipe thickness changed in the circumferential direction has also been proposed. In these hollow stabilizers, a bent part or the like is formed by bending a metal pipe with a pipe bender.

As described in, for example, Patent Literature 3 (JP 2004-009125 A) and Patent Literature 4 (JP 2010-162557 A), the pipe bender grips a portion of a predetermined length from the distal end of the pipe with a pipe clamp (chuck). Then, the pipe bender contacts the pipe with the roller while pulling the pipe, and thereby bends the pipe. For this reason, the pipe bender can suppress the bent part becoming flat to some extent, and can form a bent part having a relatively small flatness.

According to the specifications of the stabilizer, the distance from the distal end of the arm part to the bent part may be required to be shorter than that in the conventional stabilizer. To form a metal pipe by a pipe bender, the end of the pipe needs to be held with a pipe clamp (chuck). In this case, a "grip" having a certain length is required at the end of the pipe. For this reason, a stabilizer having a short distance from the distal end of the arm part to the bent part is difficult to bend by the pipe bender. Therefore, forming the bent part of the stabilizer using a die, instead of the pipe bender, was considered.

However, a problem arises that when the pipe is pushed and bent in the radial direction by a conventional die, the bent part is flattened. For example, the flatness becomes larger than that when bent by a pipe bender at a part that is bent to a right angle with a relatively small radius of curvature, such as a bent part (so called a shoulder part) between the torsion part and the arm part. The allowable range of flatness is, for example, up to ±10% of the diameter of the pipe. Since the bent part formed by the conventional metal die has a large flatness, the stress of the bent part may be a problem. In addition, if the flatness of the bent part is large, the bent part may undesirably interfere with parts around the stabilizer.

BRIEF SUMMARY OF THE INVENTION

Accordingly, an object of the present invention is to provide a hollow stabilizer, a stabilizer manufacturing device, and a hollow stabilizer manufacturing method, capable of suppressing an increase in the flatness of the cross section of the bent part and suppressing an increase in variation in the stress distribution in the circumferential direction of the cross section of the bent part.

One embodiment is a hollow stabilizer disposed in a vehicle suspension mechanism part, and comprises a torsion part, a bent part continuous with the torsion part, and an arm part continuous with the bent part.

Regarding the cross section of the pipe radial direction of the bent part, the bent part comprises a first cross-sectional part, a second cross-sectional part, a third cross-sectional part, and a fourth cross-sectional part. When the center of the bending inside is 0° and the center of the bending outside is 180°, the first cross-sectional part is in the range of 60° to 300° centered at 0°. The second cross-sectional part is formed within a range of 120° to 240° centered at 180°, and has a smaller curvature than that of the first cross-sectional part. The third cross-sectional part is formed within a range of more than 60° and less than 120° centered at 90°, and has a smaller curvature than that of the second cross-sectional part. The fourth cross-sectional part is formed within a range of more than 240° and less than 300° centered at 270°, and has a smaller curvature than that of the second cross-sectional part. The flatness of the cross section of the bent part is within ±10% of the diameter of the pipe.

A stabilizer manufacturing device according to one embodiment comprises a base die, a clamp die, a pressing die, and a moving die. The base die includes a bottom wall on which a pipe is placed, a support wall with which a side surface of the pipe is in contact, and an arc-shaped forming curved surface corresponding to a curvature of a bending inside of a bent part of the pipe. The clamp die holds the pipe by sandwiching the pipe between the support wall of the base die and the clamp die in a radial direction. The pressing die is disposed to face the bottom wall of the base die, and forms a cavity which the bent part of the pipe enters between the bottom wall and the pressing die. The moving die is disposed to face the forming curved surface of the base die. The moving die moves in a direction of bending the pipe in a state in which a part closer to the distal end side than a part that is to be the bent part is held at a part of the pipe in the longitudinal direction. Furthermore, this moving die allows the part that is to be the bent part to enter the cavity and presses the part against the forming curved surface. In this embodiment, a tapered surface that increases a distance from the bottom wall toward the opening of the cavity may be formed on a surface that faces the bottom wall on a part of the pressing die.

The hollow stabilizer manufacturing method according to one embodiment comprises a heating step, a placing step, and a bending step. The heating step heats the pipe that is a material of the hollow stabilizer to a warm region. The placing step places the pipe on a base die. The bending step forms the bent part by bending the pipe with a moving die in a state where crushing the part that is to be the bent part of the pipe in a flat shape is restricted by the base die, a clamp die, and a pressing die.

A hollow stabilizer according to another embodiment includes eight regions defined in the circumferential direction of the cross section when the center of the bending inside is 0° and the center of the bending outside is 180° in relation to a cross section in the pipe radial direction of the bent part. That is, the hollow stabilizer includes a first region including a first part located at 90°, a third region including a third part located at 0°, a fifth region including a fifth part located at 270°, a seventh region including a seventh part located at 180°, a second region including a second part between the first region and the third region, a fourth region including a fourth part between the third region and the fifth region, a sixth region including a sixth part between the fifth region and the seventh region, and an eighth region including the eighth part between the first region and the seventh region. Furthermore, the hollow stabilizer includes an outer circumferential surface on which a radius of curvature of an outer surface of each of the third part and the seventh part is larger and a radius of curvature of an outer surface of each of the second part and the sixth part is smaller than a radius of curvature of an outer surface of each of the fourth part and the fifth part. The flatness of the cross section of the bent part is within ±10% of the diameter of the pipe.

In this embodiment, the hollow stabilizer includes an inner circumferential surface on which a radius of curvature of an inner surface of each of the third part and the seventh part is larger and a radius of curvature of an inner surface of each of the second part and the sixth part is smaller than a radius of curvature of an inner surface of each of the fourth part and the fifth part.

The hollow stabilizer including a bent part according to the embodiments has a flatness smaller than that of a bent part bent by a conventional die, and the cross section of the bent part is a shape close to a perfect circle. For this reason, dispersion in the stress distribution of a bent part becoming large is suppressed. This bent part can be formed by the stabilizer manufacturing device according to the embodiments.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view showing a part of a vehicle and a stabilizer.

FIG. 2 is a plan view schematically showing an example of a hollow stabilizer according to one of embodiments.

FIG. 6 is a perspective view showing a state of bending a pipe by the stabilizer manufacturing device shown in FIG. 5.

FIG. 8 is a plan view schematically showing the stabilizer manufacturing device.

FIG. 9 is a plan view schematically showing a state of bending the pipe by the stabilizer manufacturing device.

FIG. 18 is a graph showing a relationship between the circumferential position of the bent part of Example 3 and the radius of curvature of the outer surface.

FIG. 19 is a graph showing a relationship between the circumferential position of the bent part of Example 3 and the radius of curvature of the inner surface.

FIG. 22 is a graph showing a relationship between the circumferential position of the bent part of Example 5 and the radius of curvature of the outer surface.

FIG. 23 is a graph showing a relationship between the circumferential position of the bent part of Example 5 and the radius of curvature of the inner surface.

FIG. 24 is a graph showing a relationship between the circumferential position of the bent part of Example 6 and the radius of curvature of the outer surface.

FIG. 25 is a graph showing a relationship between the circumferential position of the bent part of Example 6 and the radius of curvature of the inner surface.

DETAILED DESCRIPTION OF THE INVENTION

Figure 3:
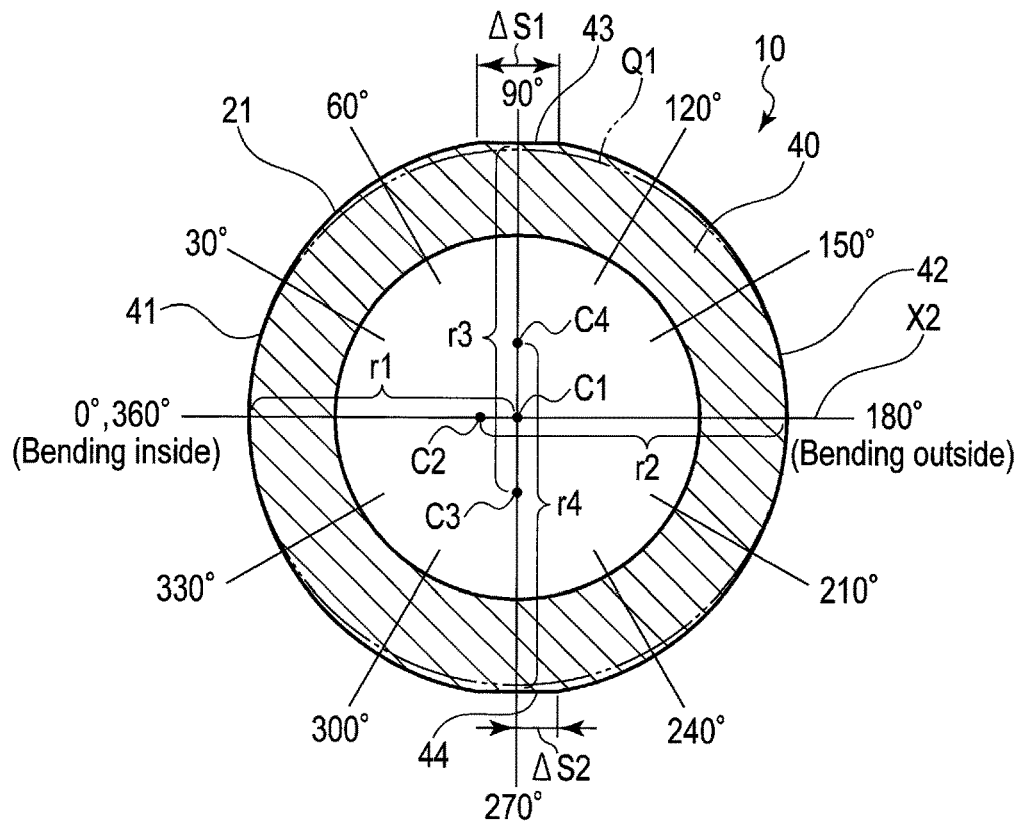
FIG. 3 is a cross-sectional view of a bent part of the hollow stabilizer taken along line F3-F3 of FIG. 2.

A hollow stabilizer 10 according to one of embodiments will be described hereinafter with reference to FIG. 1 to FIG. 4.

FIG. 1 shows a part of a vehicle 11 provided with a hollow stabilizer 10. The hollow stabilizer 10 is disposed in a suspension mechanism part 12 of the vehicle 11. The hollow stabilizer 10 includes a torsion part 20 extending in the width direction of a vehicle body 13 (direction indicated by arrow W in FIG. 1), a pair of bent parts 21 and 22 continuous with both ends of the torsion part 20, and a pair of arm parts 23 and 24 continuous with the bent parts 21 and 22.

The torsion part 20 is supported by, for example, a part of the vehicle body 13 via a pair of support parts 30 and 31 provided with rubber bushes or the like. The pair of arm parts 23 and 24 are connected to a suspension arm of the suspension mechanism part 12 via link members 32 and 33, respectively. If loads of opposite phases are input to the arm parts 23 and 24 when the vehicle 11 travels on a curve or the like, a bending force is applied to the arm parts 23 and 24 and bending and twisting forces are applied to the bent parts 21 and 22. Then, the torsion part 20 is twisted, and a repulsive load that suppresses rolling of the vehicle body 13 is thereby generated.

FIG. 2 is a plan view schematically showing the hollow stabilizer 10. The material of the hollow stabilizer 10 is a pipe 40 formed of a metal (for example, spring steel) whose strength can be improved by heat treatment such as quenching. An example of an outer diameter of the pipe 40 is 22 mm and a thickness is 3 mm. An example of the radius of curvature (center radius of curvature r) of the bent parts 21 and 22 is 50 mm. In an endurance test (double swing test), one arm part 23 is fixed at fixed point A while a load in the vertical direction is applied to load point B of the other arm part 24.

As shown in FIG. 2, the hollow stabilizer 10 has a bilaterally symmetric shape with the center in the longitudinal direction used as an axis of symmetry X1. Since the shapes of the bent parts 21 and 22 are substantially common to each other, the bent part 21 will be explained as a representative in the following descriptions. Since the other bent part 22 has the same structure, its explanations will be omitted. A specific shape of the hollow stabilizer 10 may be a three-dimensionally bent shape or one or more bent parts may be formed in the arm parts 23 and 24. In addition, one or more bent parts may be formed in the middle of the longitudinal direction of the torsion part 20.

FIG. 3 shows a cross section of the bent part 21 of the hollow stabilizer 10 (the cross section in the radial direction of the pipe 40). FIG. 3 shows a cross section at a position that an angle θ1 (shown in FIG. 2) is formed from a boundary between the torsion part 20 and the bent part 21. In this specification, in the cross section in the pipe radial direction (FIG. 3), the center of the bending inside (bending center direction) is defined as 0° and the center of the bending outside is defined as 180°.

As shown in FIG. 3, the bent part 21 includes a first cross-sectional part 41, a second cross-sectional part 42, a third cross-sectional part 43, and a fourth cross-sectional part 44 with respect to the cross section in the pipe radial direction. The center of the bending inside is defined as 0° and the center of the bending outside is defined as 180°. The first cross-sectional part 41 is in the range from 60° to 300° centered at 0°. The second cross-sectional part 42 is in the range from 120° to 240° centered at 180°. The third cross-sectional part 43 is in the range of more than 60° and less than 120° centered at 90°. The fourth cross-sectional part 44 is in the range of more than 240° and less than 300° centered at 270°. A two-dot-chained line Q1 in FIG. 3 represents a contour of a surface of the pipe 40 to be bent. The cross section of the other bent part 22 has the same shape.

A radius of curvature r1 of the first cross-sectional part 41 is the distance from first center of curvature C1 (center of the pipe 40) to the surface of the first cross-sectional part 41. A region close to 0' in the first cross-sectional part 41 forms a part of a circle (arc) equivalent to the surface of the pipe 40 to be bent.

A radius of curvature r2 of the second cross-sectional part 42 is the distance from second center of curvature C2 to the surface of the second cross-sectional part 42. The radius of curvature r2 of the second cross-sectional part 42 is larger than the radius of curvature r1 of the first cross-sectional part 41. That is, the curvature of the second cross-sectional part 42 is smaller than the curvature of the first cross-sectional part 41.

The third cross-sectional part 43 has a region indicated by ΔS1 in FIG. 3. This region ΔS1 has a nearly flat shape due to contact with a pressing wall 81 of a pressing die 80 when the bent part 21 is bent by the stabilizer manufacturing device 50. The stabilizer manufacturing device 50 will be explained later in detail. A radius of curvature r3 of the third cross-sectional part 43 is a distance from third center of curvature C3 to the surface of the third cross-sectional part 43. The radius of curvature r3 of the third cross-sectional part 43 is larger than the radius of curvature r2 of the second cross-sectional part 42.

That is, the curvature of the third cross-sectional part 43 is smaller than the curvature of the second cross-sectional part 42. When the third cross-sectional part 43 is a perfect plane, the radius of curvature r3 is infinite.

The fourth cross-sectional part 44 is in contact a bottom wall 61 of a base die 60 of the stabilizer manufacturing device 50. As a result, a region indicated by ΔS2 in FIG. 3 has a nearly flat shape. A radius of curvature r4 of the fourth cross-sectional part 44 is the distance from the fourth center of curvature C4 to the surface of the fourth cross-sectional part 44. The radius of curvature r4 of the fourth cross-sectional part 44 is larger than the radius of curvature r2 of the second cross-sectional part 42. That is, the curvature of the fourth cross-sectional part 44 is smaller than the curvature of the second cross-sectional part 42. When the fourth cross-sectional part 44 is a complete plane, the radius of curvature r4 is infinite. The surface of the third cross-sectional part 43 and the surface of the fourth cross-sectional part 44 are substantially parallel to each other.

Figure 4:
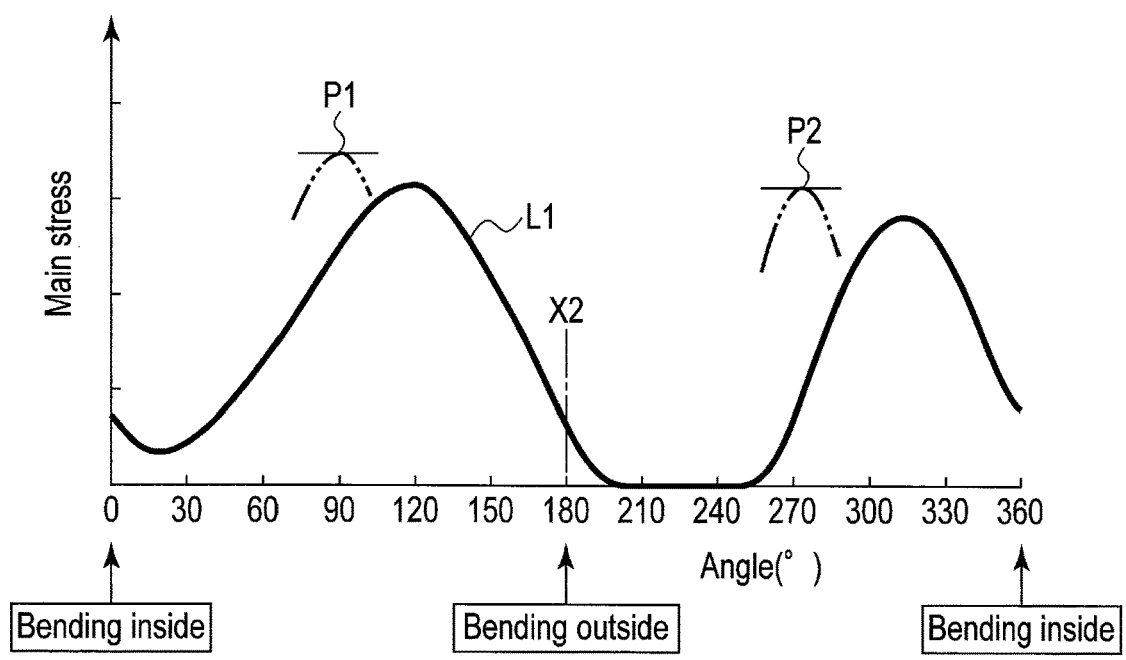
FIG. 4 is a graph showing a relationship between the position in the circumferential direction of the bent part of the hollow stabilizer shown in FIG. 3 and the stress.

The hollow stabilizer 10 includes a pair of arm parts 23 and 24. FIG. 3 shows a cross section of the bent part 21 in the pipe radial direction. FIG. 4 shows an example of a relationship (stress distribution) between the circumferential position of the cross section of the bent part 21 and the stress generated in the bent part 21 when loads having opposite phases are applied to the arm parts 23 and 24. A solid line L1 in FIG. 4 is a stress distribution when the one arm part 23 is fixed while a downward load (positive load) is applied to the other arm part 24. When an upward load (negative load) is applied to the arm part 24, the stress distribution is symmetrical with respect to the solid line L1 while the horizontal axis being 180° in FIG. 4 is set as an axis of symmetry X2.

Conventional dies have been used to bend solid stabilizers. When a pipe is bent using a conventional die, the bent part is flattened excessively and the flatness often exceeds ±10%. The flatness is the ratio of deformation to the diameter of the pipe. Since the conventional bent part has a large flatness, it cannot be used as a product. Moreover, the shape variation of the inner surface of the crushed part is large. For this reason, the peak of the stress often has been large as illustrated by P1 and P2 in FIG. 4 and the variation in stress has also been large, in the conventional bent part.

In contrast, the bent part 21 of the hollow stabilizer 10 of the present embodiment has a cross section in the pipe radial direction as shown in FIG. 3. This cross section is not exactly circular, but has a shape close to a circle. The flatness of the cross section of the bent part 21 is within ±10% of the diameter of the pipe. The stabilizer 10 of the present embodiment can be formed by a stabilizer manufacturing device 50 (shown in FIG. 5 to FIG. 11) explained below. In the cross section of the bent part 21 of the present embodiment, the absolute value of the flatness is less than 10%. Such a bent part 21 was able to reduce the variation in stress distribution as compared with a bent part bent by a conventional die and having a large flatness.

A compressive residual stress effective for durability can be generated by performing shot peening on the outer surface of the hollow stabilizer 10. However, performing shot peening on the inner surface of the hollow stabilizer 10 is actually difficult. It is not desirable that the peak of stress generated on the inner surface of the hollow stabilizer 10 (the inner surface of the pipe 40) is high or that the shape variation of the inner surface is large. This is because if a defect such as a scratch exists on the inner surface of the pipe 40, it may become the starting point of breakage. For this reason, the hollow stabilizer 10 is desired to particularly minimize the peak of stress on the inner surface side as much as possible. The bent part 21 of the hollow stabilizer 10 of the present embodiment is a cross section close to a circle in which the flatness is suppressed. For this reason, the peak value of the stress can be lowered as compared with the stress of the conventional bent part having a large flatness.

Figure 5:
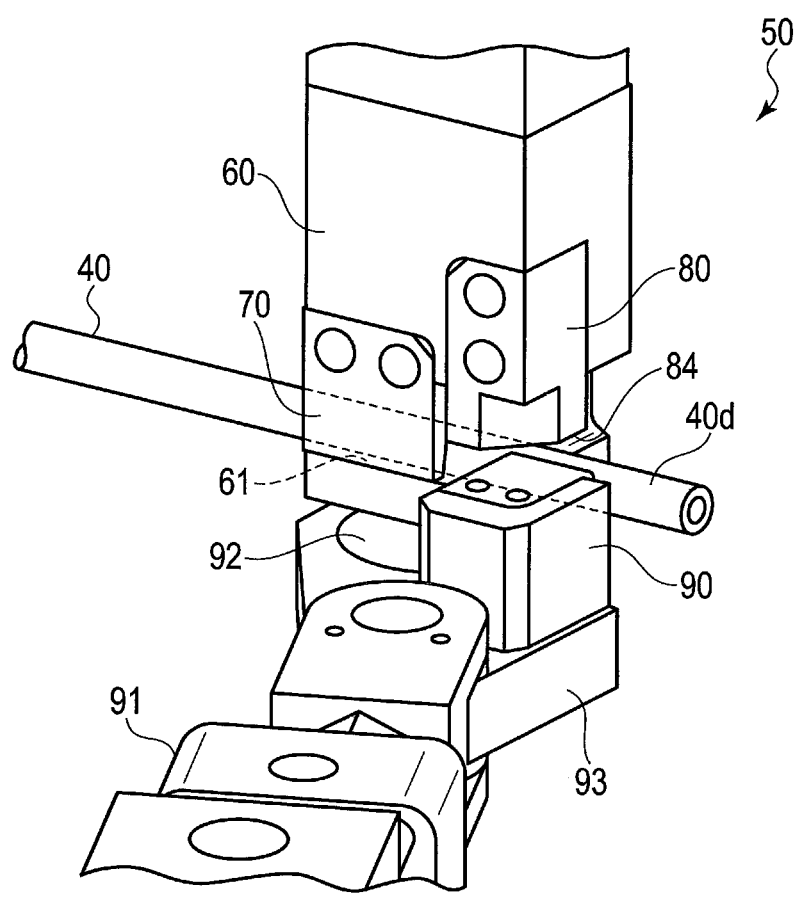
FIG. 5 is a perspective view of a stabilizer manufacturing device according to one of the embodiments.
Figure 7:
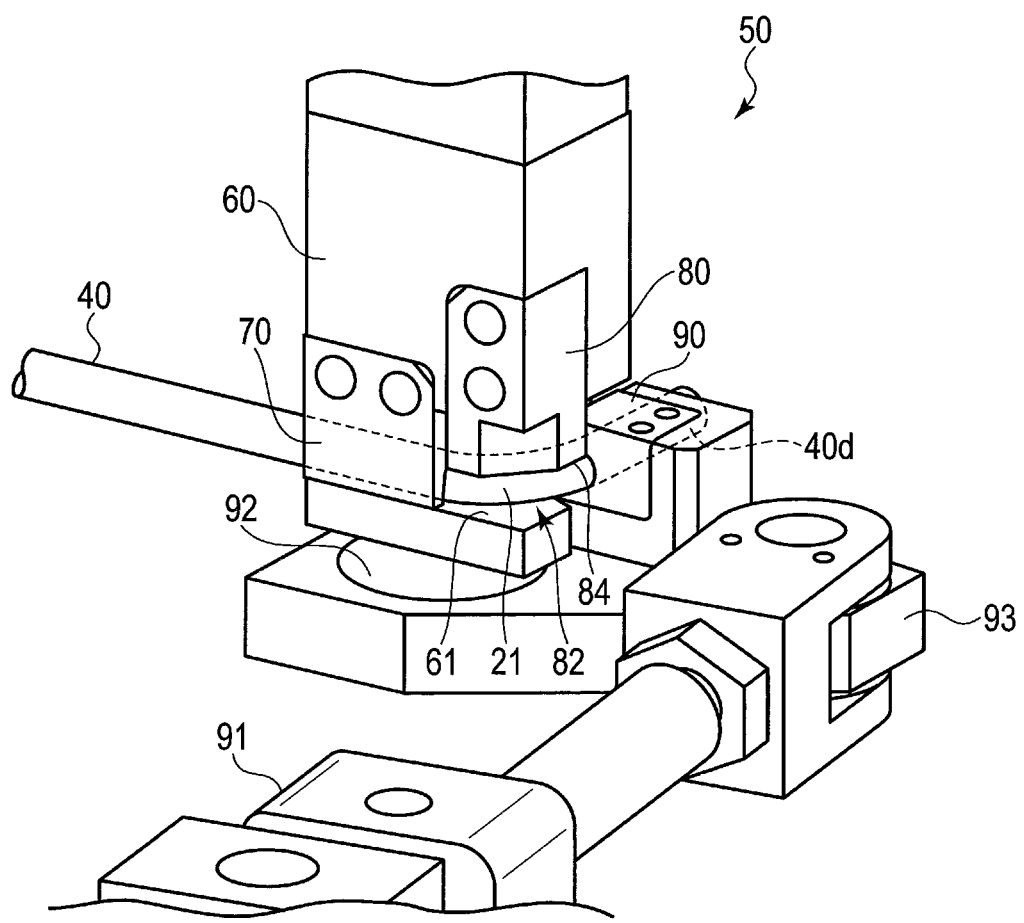
FIG. 7 is a perspective view of a state where bending the pipe by the stabilizer manufacturing device is finished.

The stabilizer manufacturing device 50 according to the present embodiment will be explained hereinafter with reference to FIG. 5 to FIG. 11. FIG. 5 is a perspective view showing a part of the stabilizer manufacturing device 50. FIG. 6 shows a state where a part of the pipe 40 (bent part 21) is bent by the stabilizer manufacturing device 50. FIG. 7 shows a state where the bending step using the stabilizer manufacturing device 50 is finished. FIG. 8 to FIG. 11 are plan views schematically showing the stabilizer manufacturing device 50, respectively. FIG. 11 is a cross-sectional view of the stabilizer manufacturing device 50 taken along line F11-F11 in FIG. 10.

The stabilizer manufacturing device 50 includes a base die 60, a clamp die 70, a pressing die 80, a moving die 90, an actuator 91 such as a hydraulic cylinder for driving the moving die 90, and the like.

As shown in FIG. 11, the base die 60 includes a bottom wall 61, a support wall 62, and an arc-shaped forming curved surface 63. A lower surface 40a of the pipe 40 is in contact with the bottom wall 61. A side wall 40b of the pipe 40 is in contact with the support wall 62. The forming curved surface 63 is curved in accordance with the curvature of the bending inside of the bent part 21. The forming curved surface 63 is formed between the bottom wall 61 and the support wall 62. The forming curved surface 63 forms an arc having a quarter of the curvature corresponding to the outer diameter of the pipe 40.

Figure 10:
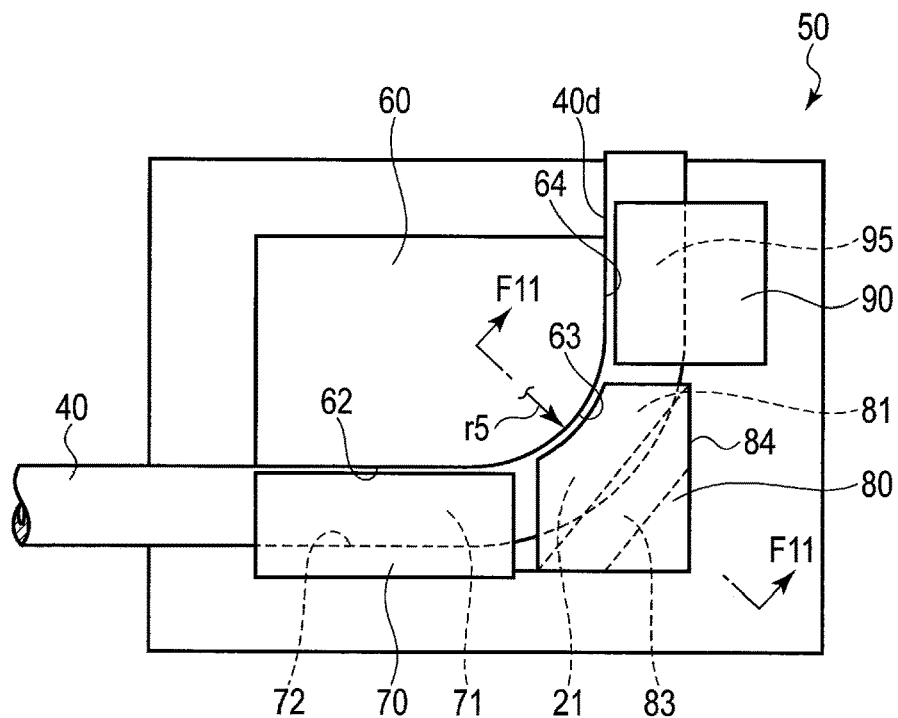
FIG. 10 is a plan view schematically showing a state in which bending the pipe by the stabilizer manufacturing device is finished.
Figure 11:
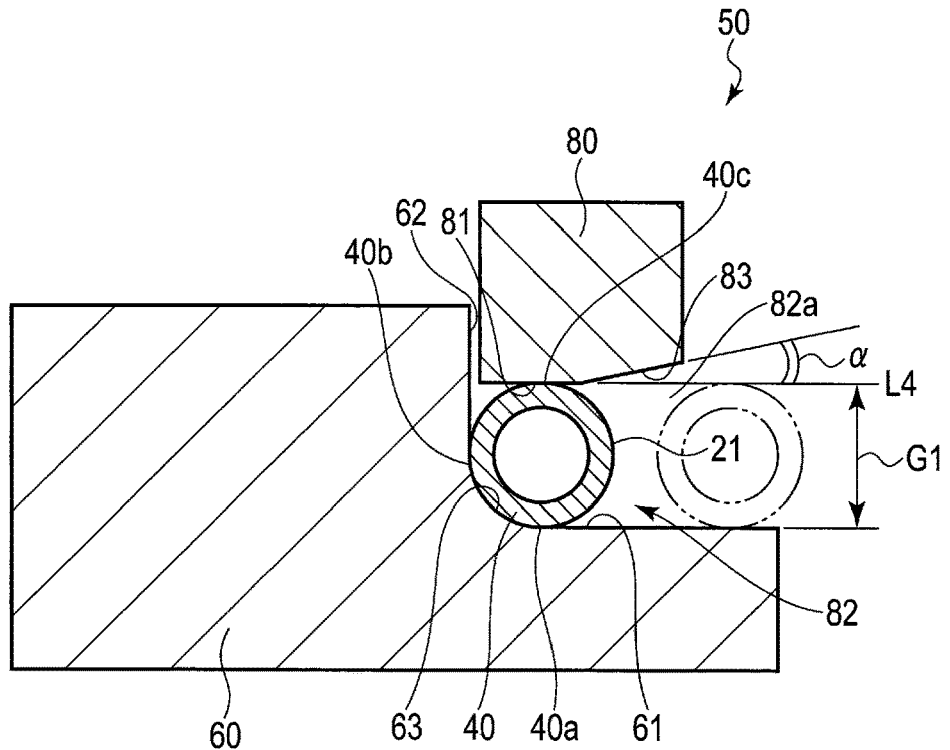
FIG. 11 is a cross-sectional view of the stabilizer manufacturing device taken along line F11-F11 of FIG. 10.

As shown in FIG. 8 to FIG. 10, the forming curved surface 63 forms an arc as viewed from the upper side of the base die 60. The radius of curvature of the forming curved surface 63 corresponds to a radius of curvature r5 (shown in FIG. 10) of the bending inside of the bent part 21. A vertical wall 64 is formed continuously to the forming curved surface 63. The pipe 40 is placed on the bottom wall 61 of the base die 60.

The clamp die 70 includes a first clamp wall 71 (shown in FIG. 7 to FIG. 9) and a second clamp wall 72. The pipe 40 is sandwiched in the radial direction between the first clamp wall 71 and the bottom wall 61 of the base die 60. The pipe 40 is sandwiched in the radial direction between the second clamp wall 72 and the support wall 62 of the base die 60. An upper surface 40c of the pipe 40 is in contact with the first clamp wall 71. The pipe 40 is fixed by the base die 60 and the clamp die 70.

The pressing die 80 is disposed to face the upper side of the bottom wall 61 of the base die 60. As shown in FIG. 11, the pressing wall 81 is formed on the lower surface of the pressing die 80. The pressing wall 81 faces the bottom wall 61 of the base die 60. A cavity 82 into which the pipe 40 can enter is formed between the pressing wall 81 and the bottom wall 61. An opening width G1 in the vertical direction of the cavity 82 is slightly larger than the diameter of the pipe 40.

A tapered surface 83 is formed on a part of the pressing die 80 (a part of the pressing wall 81). The tapered surface 83 faces the bottom wall 61 of the base die 60. The opening width G1 shown in FIG. 11 is a distance between the tapered surface 83 and the bottom wall 61. The tapered surface 83 is inclined such that the opening width G1 gradually increases toward the opening 82a of the cavity 82. The inclination angle of the tapered surface 83, that is, an angle α formed by the tapered surface 83 with respect to the line segment L4 parallel to the bottom wall 61 is, for example, approximately 10° to 20°. This angle α is a value that changes according to the diameter, thickness, etc., of the pipe 40.

The moving die 90 is disposed to face the forming curved surface 63 of the base die 60 in the horizontal direction. As shown in FIG. 5 to FIG. 7, the moving die 90 is attached to the arm 93. When the arm 93 is rotated by the actuator 91, the moving die 90 moves in the direction of bending the pipe 40. That is, the moving die 90 is reciprocally rotated from the initial position (position shown in FIG. 5 and FIG. 8) to the bending end position (position shown in FIG. 7 and FIG. 10) around a shaft 92 by the actuator 91.

The moving die 90 includes a holding portion 95 that holds the pipe 40. The holding portion 95 holds a part of the pipe 40, that is, a part 40d closer to the distal end side than a part that becomes the bent part 21. The part 40d on the distal end side of the pipe 40 is held by the holding portion 95. In this state, the moving die 90 rotates around the shaft 92. Thus, the holding portion 95 moves in a direction in which the pipe 40 is bent. Then, the part that becomes the bent part 21 enters the cavity 82 and is pressed against the forming curved surface 63.

As shown in FIG. 5 and FIG. 8, the pipe 40 is inserted between the base die 60 and the clamp die 70, and the pipe 40 is fixed. At this time, the moving die 90 is retracted to a position where it does not interfere with the pipe 40. The part 40d on the distal end side of the pipe 40 is in a state of protruding to the outside of the base die 60. The pipe 40 is heated by a heating means in advance in a warm region of, for example, 700° C. or less (temperature lower than the temperature at which the steel is austenitized). The heated pipe 40 has a hardness that enables the pipe to be plastically processed more easily when bent than when it is cold (room temperature). An example of the heating means is a heating furnace, but electric heating or high-frequency induction heating may be employed.

As shown in FIG. 6 and FIG. 9, when the actuator 91 is actuated, the moving die 90 rotates around the shaft 92 toward the vertical wall 64 of the base die 60. The part that becomes the bent part 21 of the pipe 40 enters the cavity 82 during the rotation. At this time, the upper surface 40c of the pipe 40 moves toward the forming curved surface 63 at the back of the cavity 82 while contacting the tapered surface 83. For this reason, it is suppressed that the upper surface 40c of the pipe 40 is scratched. Then, as shown in FIG. 7 and FIG. 10, the bent part 21 is formed by moving the movable die 90 to the bending end position.

Thus, the manufacturing method of the hollow stabilizer of the present embodiment comprises the heating step, the placing step, and the bending step. The material of the hollow stabilizer 10 is the pipe 40. In the heating step, the pipe 40 is heated to a warm region by the heating means. In the placing step, the pipe 40 is placed on the base die 60 of the stabilizer manufacturing device 50. In the bending step, the bent part 21 is formed by bending the pipe 40 by the moving die 90 in a state where crushing the part that is the bent part 21 in a flat shape is restricted by the base die 60, the clamp die 70, and the pressing die 80 of the stabilizer manufacturing device 50.

According to the stabilizer manufacturing device 50 of the present embodiment, the bent part 21 enters the cavity 82 while a part of the pipe 40 in the longitudinal direction (the bent part 21) is bent. Accordingly, the bottom wall 61 and the pressing wall 81 can suppress the bent part 21 being flattened. The cavity 82 is formed between the bottom wall 61 and the pressing wall 81. Moreover, the bent part 21 is restrained with the upper surface being in contact with the pressing wall 81. For this reason, the third cross-sectional part 43 having a small curvature is formed. The bent part 21 is restrained with the lower surface being in contact with the bottom wall 61. The fourth cross-sectional part 44 having a small curvature is thereby formed. If the bottom wall 61 and the pressing wall 81 are parallel to each other, the surface of the third cross-sectional part 43 and the surface of the fourth cross-sectional part 44 are parallel to each other.

When the bent part 21 is bent by the stabilizer manufacturing device 50, the outside of the bending is stretched. For this reason, the outside of the bending becomes slightly flat. Therefore, the curvature of the outside of the bending (second cross-sectional part 42) is smaller than the curvature of the inside of the bending (first cross-sectional part 41). That is, the radius of curvature r2 of the second cross-sectional part 42 is larger than the radius of curvature r1 of the first cross-sectional part 41.

The third cross-sectional part 43 is plastically deformed by being pressed in the radial direction by the pressing wall 81 of the pressing die 80. For this reason, the part that is in contact with the pressing wall 81 becomes flat. When the pressurization is released, the shape returns slightly, but the surface of the third cross-sectional part 43 is nearly flat. For this reason, the curvature of the third cross-sectional part 43 is smaller than the curvature of the second cross-sectional part 42.

The fourth cross-sectional part 44 is plastically deformed by being pressurized in the radial direction by the bottom wall 61 of the base die 60. For this reason, the part that is in contact with the bottom wall 61 becomes flat. When the pressurization is released, the shape returns slightly, but the surface of the fourth cross-sectional part 44 is nearly flat. For this reason, the curvature of the fourth cross-sectional part 44 is smaller than the curvature of the second cross-sectional part 42.

Thus, when the bent part 21 is formed by the stabilizer manufacturing device 50 of the present embodiment, the cross section of the bent part 21 is not a perfect circle correctly, but it is possible to suppress the flatness becoming large. In addition, the tapered surface 83 is formed on the lower surface (pressing wall 81) of the pressing die 80. The upper surface of the pipe 40 moves toward the forming curved surface 63, along the tapered surface 83, while being bent. For this reason, the upper surface of the bent part 21 can be prevented from contacting a side surface 84 of the pressing die 80 and being scratched.

According to the stabilizer manufacturing device 50 of the present embodiment, a "grip" at the end of the pipe, which is required when the pipe is bent by the pipe bender, is unnecessary. For this reason, the bent part of the stabilizer with a short distance from the distal end of the pipe to the bent part can also be bent. Moreover, it is possible to suppress the cross section of the bent part being flattened excessively, and to form a bent part that is closer to a perfect circle with the flatness suppressed. The flatness of the cross section of the bent part is within ±10% of the diameter of the pipe.

The pipe 40 heated to the warm region and having a low deformation resistance tends to have a large flatness at the bent part. According to the stabilizer manufacturing device 50 of the present embodiment, however, even if the pipe 40 is preheated to a warm region and has a deformation resistance lowered, the bent part 21 having the flatness suppressed can be formed when bending is performed.

Figure 12:
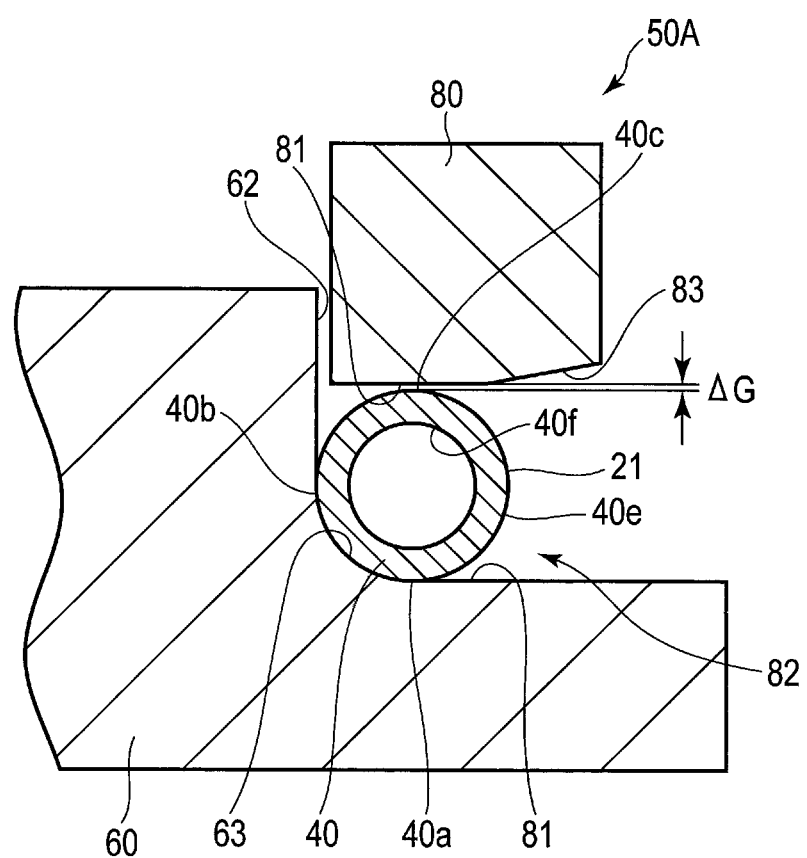
FIG. 12 is a cross-sectional view showing another embodiment of the stabilizer manufacturing device.

FIG. 12 shows a part of a stabilizer manufacturing device 50A according to the other embodiment. In this embodiment, a minute gap ΔG of approximately several tens to several hundreds of μm is formed between an upper surface of a pipe 40 placed on a bottom wall 61 of a base die 60 and a pressing die 80. The pipe 40 is allowed to move by a minute amount with respect to the base die 60 by the gap ΔG. Since the stabilizer manufacturing device 50A is the same as the stabilizer manufacturing device 50 (FIG. 5 to FIG. 11) with respect to the other constituent elements, they are referred to as the same reference numerals common to both of the embodiments and their explanations will be omitted.

Figure 13:
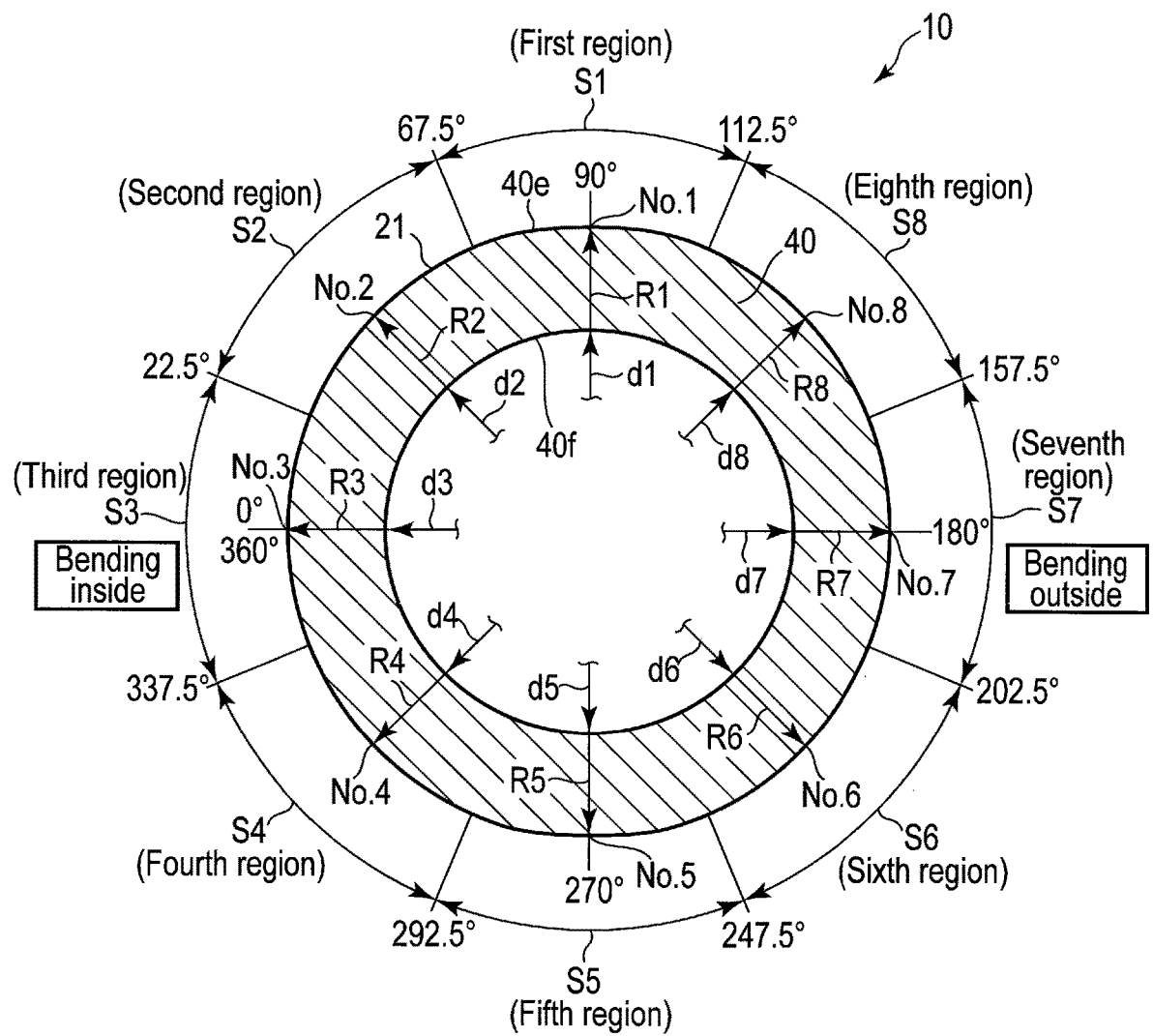
FIG. 13 is a cross-sectional view showing a section in a radial direction of the bent part of the other embodiment of the hollow stabilizer.

FIG. 13 shows a cross section (cross section of the pipe radial direction) of a curved part 21 of a hollow stabilizer 10 manufactured by the stabilizer manufacturing device 50A. An outer circumferential surface 40e and an inner circumferential surface 40f of the pipe 40 are shown in FIG. 13. The outer circumferential surface 40e and an inner circumferential surface 40f of the bent part 21 are not perfect circles, but slightly distorted circles as explained below in detail. The flatness of the cross section of the bent part 21 is within ±10% of the diameter of the pipe.

As shown in FIG. 13, the cross section in the radial direction of the bent part 21 includes eight regions S1 to S8 defined by 45° in the circumferential direction. That is, the cross section includes a first region S1 centered at 90°, a third region S3 centered at 0°, a fifth region S5 centered at 270°, and a seventh region S7 centered at 180°. The first part No. 1 is included in the first region S1. The third part No. 3 is included in the third region S3. The fifth part No. 5 is included in the fifth region S5. The seventh part No. 7 is included in the seventh region S7.

Furthermore, the bent part 21 includes a second region S2 between the first region S1 and the third region S3, a fourth region S4 between the third region S3 and the fifth region S5, a sixth region S6 between the fifth region S5 and the seventh region S7, and an eighth region S8 between the first region S1 and the seventh region S7. The second part No. 2 is included in the second region S2. The fourth part No. 4 is included in the fourth region S4. The sixth part No. 6 is included in the sixth region S6. The eighth part No. 8 is included in the eighth region S8.

In the cross section shown in FIG. 13, the first region S1 is defined in a range from 67.5° to 112.5°. The first part No. 1 exists in the first region S1 centered at 90°. The third region S3 is defined in a range from 22.5° to 337.5°. The third part No. 3 exists in the third region S3 centered at 0°. The fifth region S5 is defined in a range from 247.5° to 292.5°. The fifth part No. 5 exists in the fifth region S5 centered at 270°. The seventh region S7 is defined in a range from 157.5° to 202.5°. The seventh part No. 7 exists in the seventh region S7 centered at 180°.

In the cross section shown in FIG. 13, the second region S2 is defined between the first region S1 and the third region S3. The second part No. 2 exists in the second region S2 centered at 45°. The fourth region S4 is defined between the third region S3 and the fifth region S5. The fourth part No. 4 exists in the fourth region S4 centered at 315°. The sixth region S6 is defined between the fifth region S5 and the seventh region S7. The sixth part No. 6 exists in the sixth region S6 centered at 225°. The eighth region S8 is defined between the first region S1 and the seventh region S7. The eighth part No. 8 exists in the eighth region S8 centered at 135°.

In FIG. 13, R1 to R8 represent radii of curvature of outer surfaces of the first to eighth parts (No. 1 to No. 8). In FIG. 13, d1 to d8 represent radii of curvature of inner surfaces of the first to eighth parts (No. 1 to No. 8).

Figure 14:
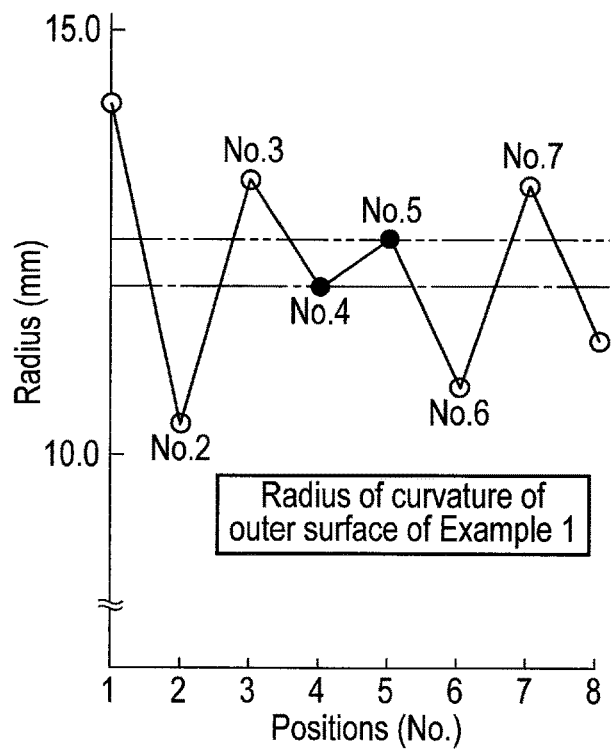
FIG. 14 is a graph showing a relationship between the circumferential position of the bent part of Example 1 and the radius of curvature of the outer surface.
Figure 15:
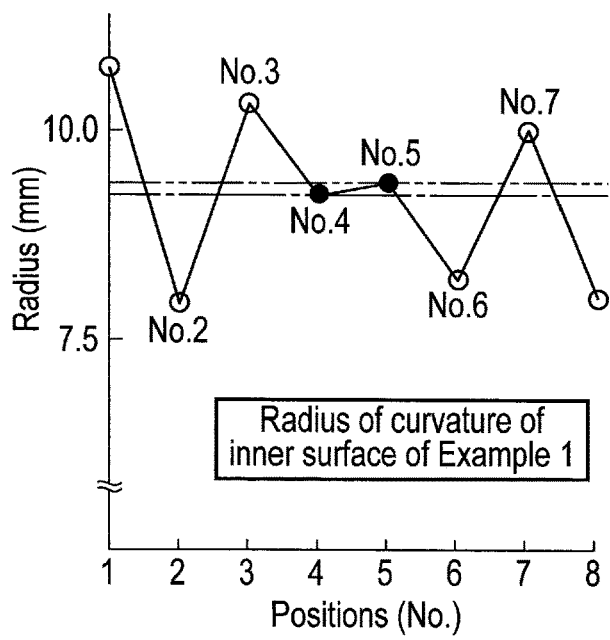
FIG. 15 is a graph showing a relationship between the circumferential position of the bent part of Example 1 and the radius of curvature of the inner surface.

FIG. 14 shows a relationship between the positions in the circumferential direction of the curved parts and the radii of curvature of the outer surfaces, of Example 1 manufactured by the stabilizer manufacturing device 50A on trial. FIG. 15 shows a relationship between the positions in the circumferential direction and the radii of curvature of the inner surfaces, of Example 1. The outer diameter of the pipe to be bent is 22.2 mm, and the thickness of the pipe is 3.1 mm.

Figure 16:
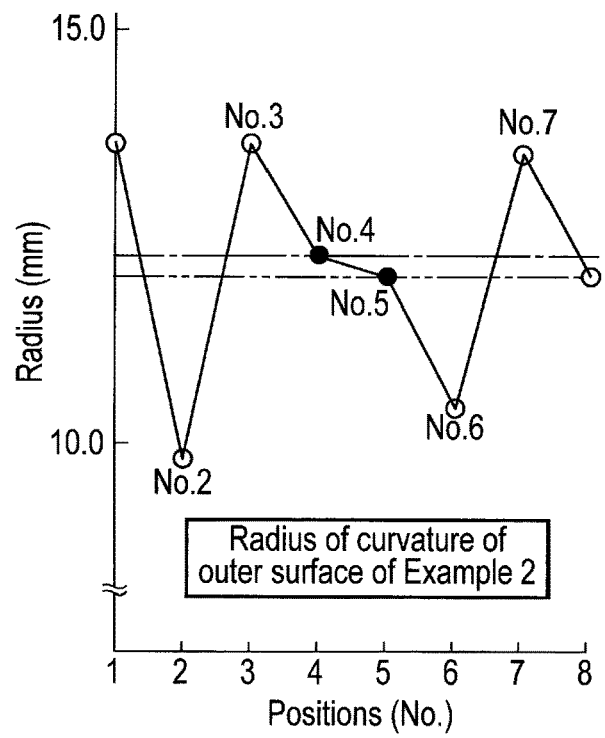
FIG. 16 is a graph showing a relationship between the circumferential position of the bent part of Example 2 and the radius of curvature of the outer surface.
Figure 17:
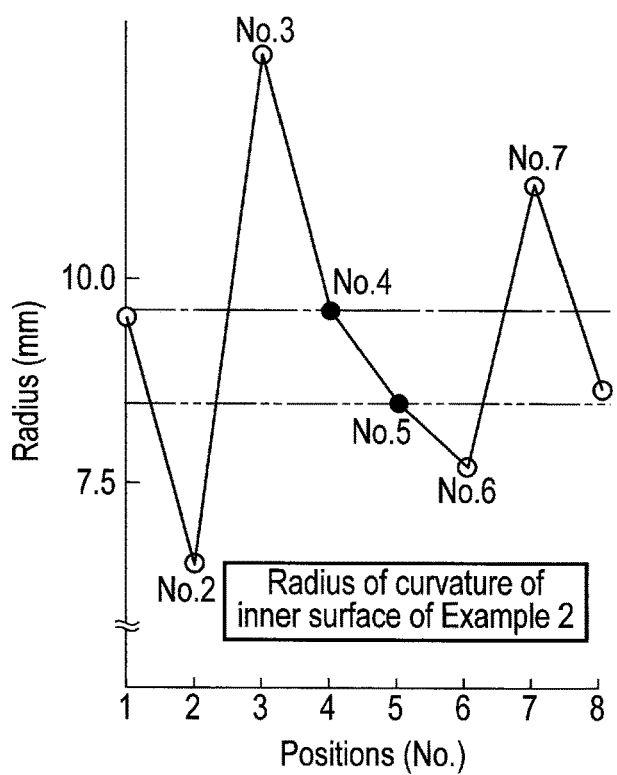
FIG. 17 is a graph showing a relationship between the circumferential position of the bent part of Example 2 and the radius of curvature of the inner surface.

FIG. 16 shows a relationship between the positions in the circumferential direction of the curved parts and the radii of curvature of the outer surfaces, of Example 2 manufactured by the stabilizer manufacturing device 50A on trial. FIG. 17 shows a relationship between the positions in the circumferential direction and the radii of curvature of the inner surfaces, of Example 2. The outer diameter and the thickness of the pipe to be bent are the same as those in Example 1.

FIG. 18 shows a relationship between the positions in the circumferential direction of the curved parts and the radii of curvature of the outer surfaces, of Example 3 manufactured by the stabilizer manufacturing device 50A on trial. FIG. 19 shows a relationship between the positions in the circumferential direction and the radii of curvature of the inner surfaces, of Example 3. The outer diameter and the thickness of the pipe to be bent are the same as those in Example 1.

Figure 20:
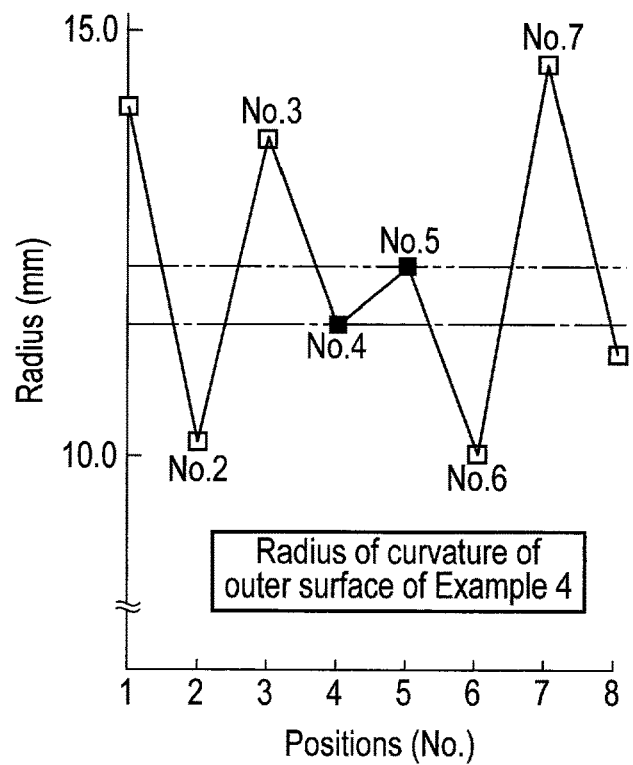
FIG. 20 is a graph showing a relationship between the circumferential position of the bent part of Example 4 and the radius of curvature of the outer surface.
Figure 21:
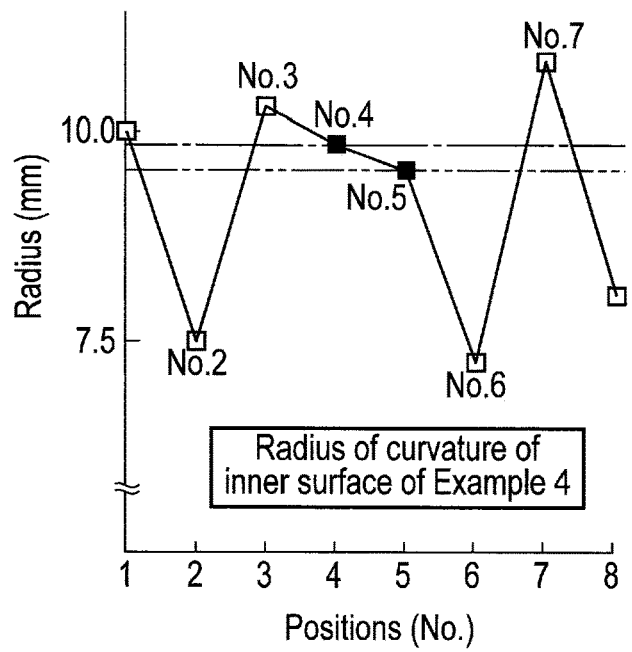
FIG. 21 is a graph showing a relationship between the circumferential position of the bent part of Example 4 and the radius of curvature of the inner surface.

FIG. 20 shows a relationship between the positions in the circumferential direction of the curved parts and the radii of curvature of the outer surfaces, of Example 4 manufactured by the stabilizer manufacturing device 50A on trial. FIG. 21 shows a relationship between the positions in the circumferential direction and the radii of curvature of the inner surfaces, of Example 4. The outer diameter of the pipe to be bent is 22.2 mm, and the thickness of the pipe is 4.4 mm.

FIG. 22 shows a relationship between the positions in the circumferential direction of the curved parts and the radii of curvature of the outer surfaces, of Example 5 manufactured by the stabilizer manufacturing device 50A on trial. FIG. 23 shows a relationship between the positions in the circumferential direction and the radii of curvature of the inner surfaces, of Example 5. The outer diameter and the thickness of the pipe to be bent are the same as those in Example 4.

FIG. 24 shows a relationship between the positions in the circumferential direction of the curved parts and the radii of curvature of the outer surfaces, of Example 6 manufactured by the stabilizer manufacturing device 50A on trial. FIG. 25 shows a relationship between the positions in the circumferential direction and the radii of curvature of the inner surfaces, of Example 6. The outer diameter and the thickness of the pipe to be bent are the same as those in Example 4.

Figure 26:
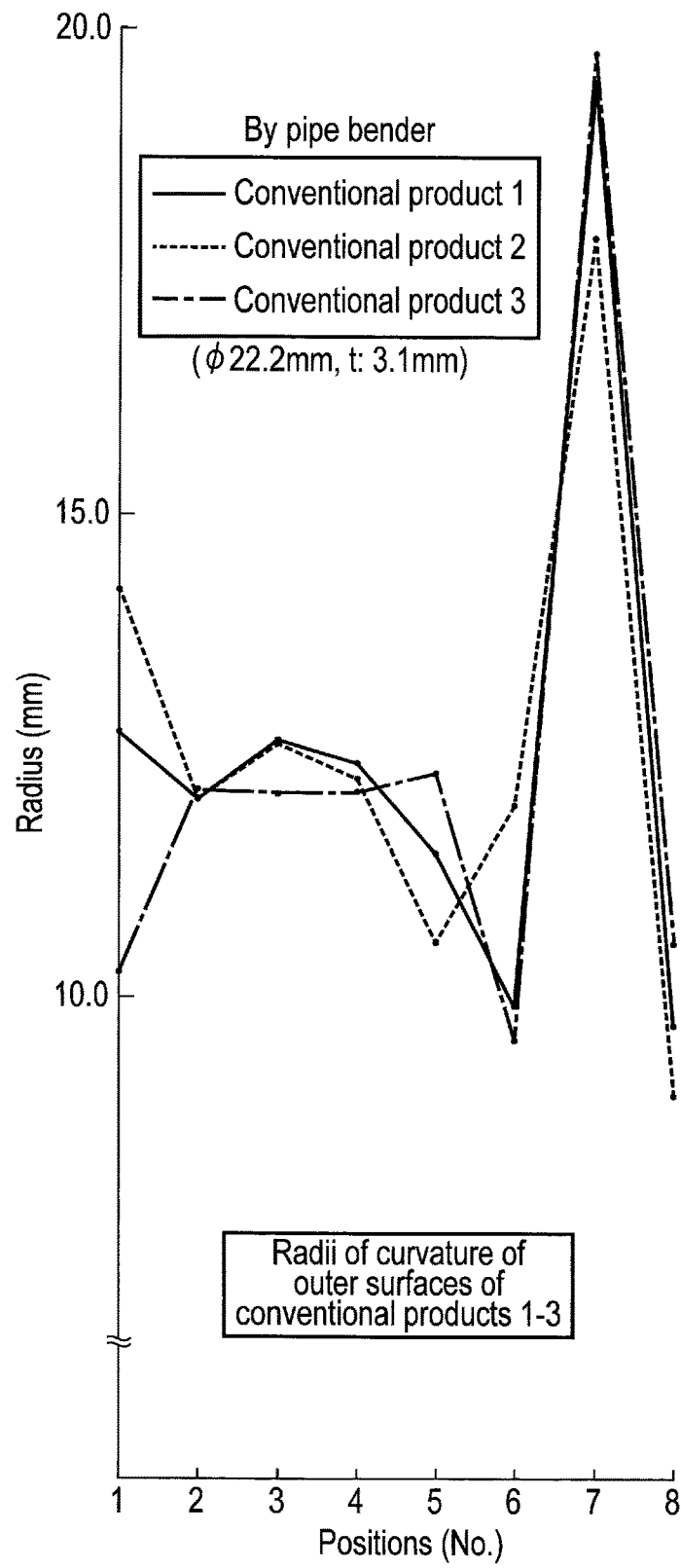
FIG. 26 is a graph showing a relationship between the position of the bent part of conventional products 1 to 3 and the radius of curvature of the outer surface.
Figure 27:
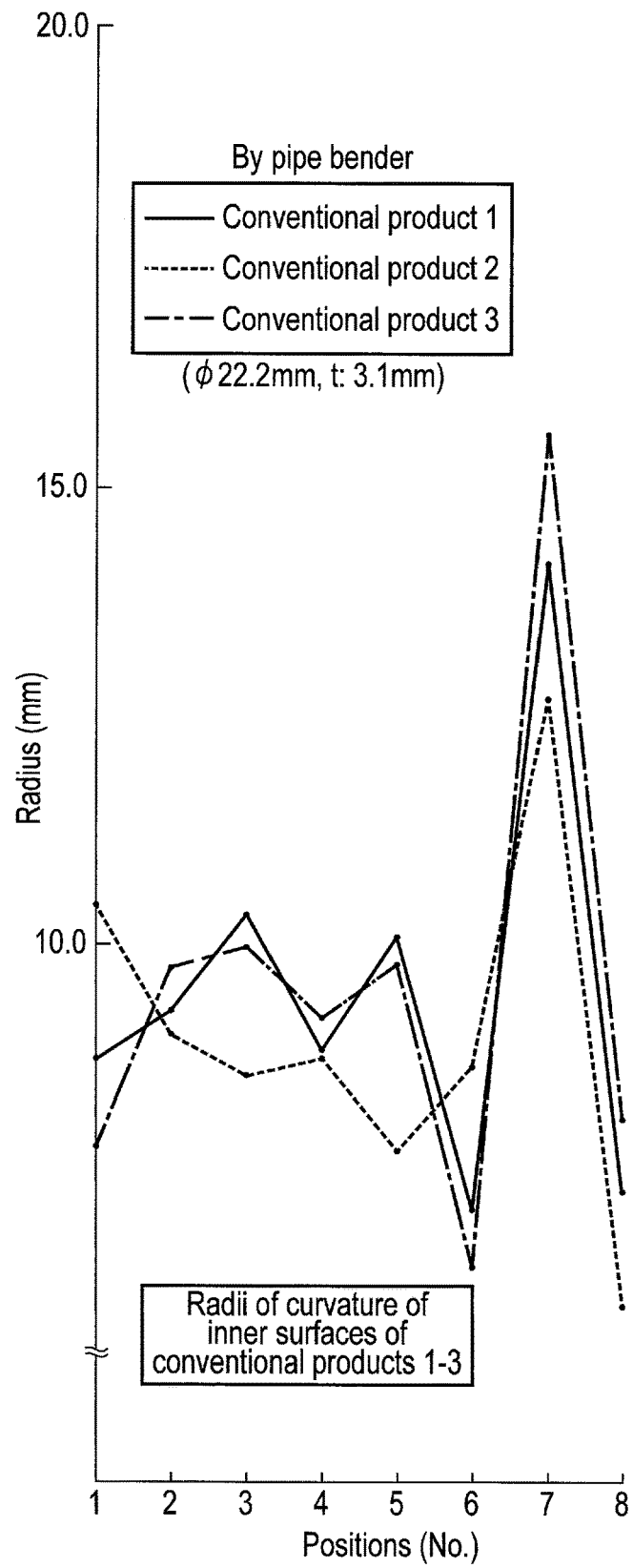
FIG. 27 is a graph showing a relationship between the position of the bent part of conventional products 1 to 3 and the radius of curvature of the inner surface.

In contrast, FIG. 26 shows a relationship between the positions in the circumferential direction of the curved parts and the radii of curvature of the outer surfaces, of each of conventional products 1, 2, and 3 manufactured by a pipe bender. Similarly, FIG. 27 shows a relationship between the positions in the circumferential direction of the curved parts and the radii of curvature of the inner surfaces, of each of conventional products 1, 2, and 3. The outer diameter and the thickness of the pipe to be bent in each of the articles are the same as those in Example 1.

Figure 28:
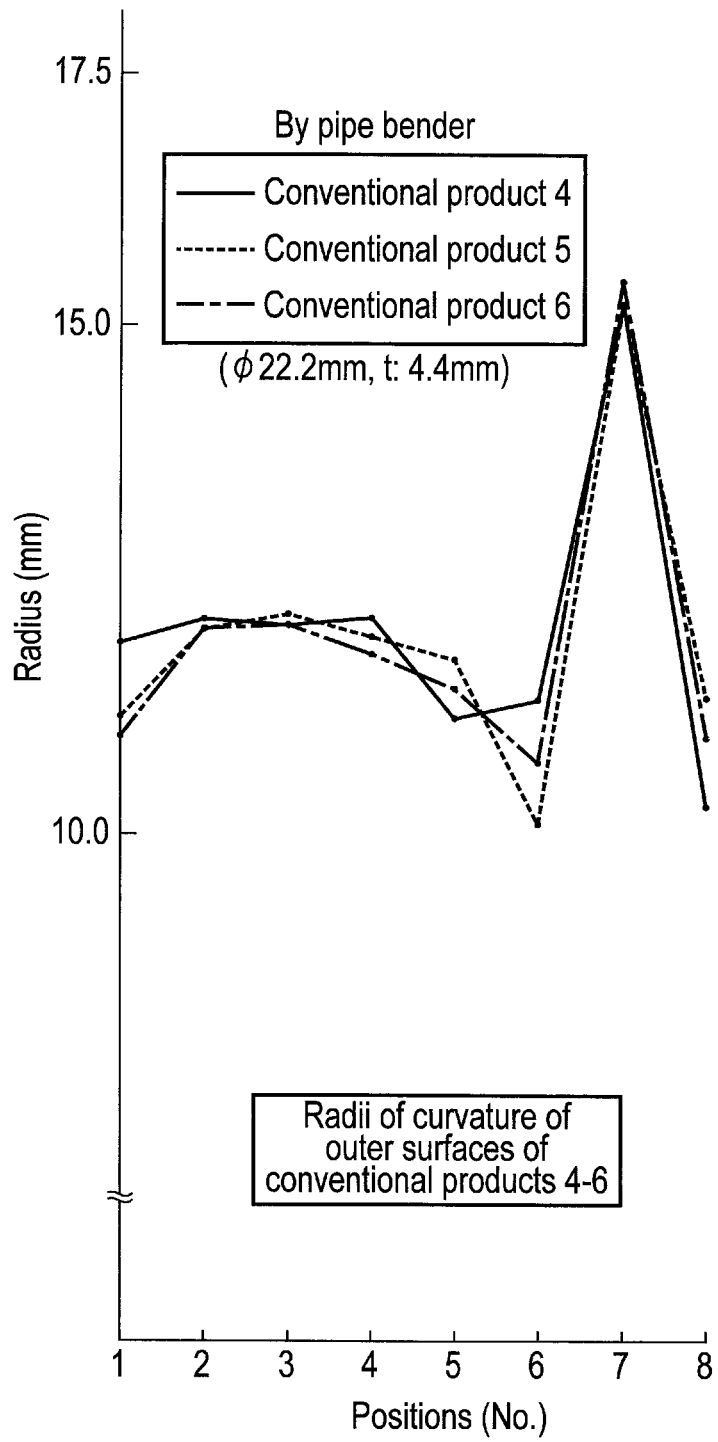
FIG. 28 is a graph showing a relationship between the position of the bent part of conventional products 4 to 6 and the radius of curvature of the outer surface.
Figure 29:
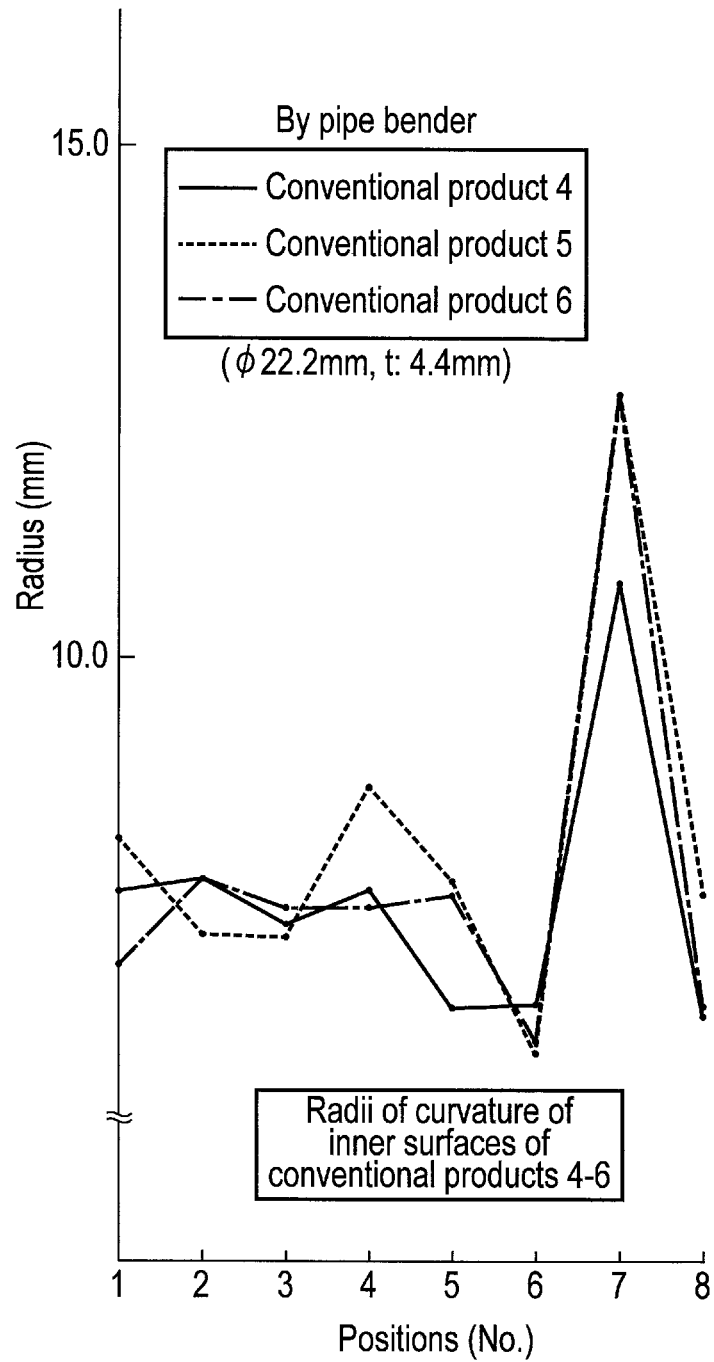
FIG. 29 is a graph showing a relationship between the position of the bent part of conventional products 4 to 6 and the radius of curvature of the inner surface.

FIG. 28 shows a relationship between the positions in the circumferential direction of the curved parts and the radii of curvature of the outer surfaces, of each of conventional products 4, 5, and 6 manufactured by a pipe bender. Similarly, FIG. 29 shows a relationship between the positions in the circumferential direction of the curved parts and the radii of curvature of the inner surfaces, of each of conventional products 4, 5, and 6. The outer diameter and the thickness of the pipe to be bent in each of the articles are the same as those in Example 4.

Comparison between Examples 1 to 6 (FIG. 14 to FIG. 25) and conventional products 1 to 6 (FIG. 26 to FIG. 29) indicates that Examples 1 to 6 have the following characteristic shape on the outer circumferential surface 40e of the bent part. That is, in Examples 1 to 6, the radii of curvature R3 and R7 of the respective outer surfaces of the third part No. 3 and the seventh part No. 7 are larger and the radii of curvature R2 and R6 of the respective outer surfaces of the second part No. 2 and the sixth part No. 6 are smaller than the radii of curvature R4 and R5 of the respective outer surfaces of the fourth part No. 4 and the fifth part No. 5. This feature cannot be seen in the conventional products 1 to 6.

Moreover, in Examples 1 to 6, the inner circumferential surface 40f also has a characteristic shape. That is, in Examples 1 to 6, the radii of curvature d3 and d7 of the respective inner surfaces of the third part No. 3 and the seventh part No. 7 are larger and the radii of curvature d2 and d6 of the respective inner surfaces of the second part No. 2 and the sixth part No. 6 are smaller than the radii of curvature d4 and d5 of the respective inner surfaces of the fourth part No. 4 and the fifth part No. 5. This feature cannot be seen in the conventional products 1 to 6 either.

The hollow stabilizer including a bent part according to Examples 1 to 6 has a flatness smaller than that of a bent part bent by a conventional pipe bender, and the cross section of the bent part is a shape close to a perfect circle. For this reason, dispersion in the stress distribution of a bent part becoming large is suppressed. The hollow stabilizer having such a bent part can be formed by the stabilizer manufacturing device 50A according to the above-described embodiment.

The present invention can also be applied to a stabilizer of a suspension mechanism of a vehicle other than a car. In carrying out the present invention, it goes without saying that the specific shapes, dimensions, etc., of the torsion part, the arm part, and the bent part can be variously changed including the metal pipe which is the material of the hollow stabilizer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stabilizer manufacturing device for manufacturing a hollow stabilizer from a pipe having a circular cross-section in a radial direction, the stabilizer manufacturing device comprising:
    a base die including a bottom wall configured to have the pipe placed thereon, a support wall extending in a direction perpendicular to the bottom wall and configured to contact a side surface of the pipe, and an arc-shaped forming curved surface provided between the bottom wall and the support wall, the arc-shaped forming curved surface being continuous with the bottom wall and the support wall, the arc-shaped forming curved surface being configured to correspond to a curvature of a bending inside of a part of the pipe to be bent, and the arc-shaped forming curved surface being configured to contact a surface of the bending inside of the pipe;
    a clamp die configured to hold the pipe by sandwiching the pipe between the support wall of the base die and the clamp die in the radial direction;
    a pressing die disposed to face the bottom wall of the base die, the pressing die comprising a pressing wall parallel to the bottom wall and a tapered surface, wherein the pressing die forms a cavity between the bottom wall and the pressing wall and tapered surface of the pressing die, the cavity being configured to receive the part of the pipe to be bent, and wherein a distance from the bottom wall to the tapered surface increases with distance from the pressing wall toward an opening of the cavity; and
    a moving die configured to contact a part of the pipe that is distal, along a longitudinal direction of the pipe, with respect to the part of the pipe to be bent, the moving die being movable in a direction of bending the pipe to allow the part of the pipe to be bent to enter the cavity and to press the part of the pipe to be bent against the arc-shaped forming curved surface.

2. The stabilizer manufacturing device of claim 1, wherein the pressing wall of the pressing die and the bottom wall of the base die are configured such that a minute gap is defined between the pressing wall of the pressing die and an upper surface of the pipe in a state in which the pipe is placed on the bottom wall of the base die.

3. A method of manufacturing a hollow stabilizer by using the stabilizer manufacturing device of claim 1, the method comprising:
    heating the pipe;
    placing the pipe on the base die; and
    forming a bent part by bending the pipe with the moving die in a state in which crushing into a flat shape of the part of the pipe to be bent is restricted by the base die, the clamp die, and the pressing die.

* * * * *